(12) United States Patent
Drozhak et al.

(10) Patent No.: US 12,072,792 B2
(45) Date of Patent: Aug. 27, 2024

(54) SOFTWARE TESTING USING MACHINE LEARNING

(71) Applicant: DataRobot, Inc., Boston, MA (US)

(72) Inventors: Borys Drozhak, Boston, MA (US);
Ievgenii Baliuk, Boston, MA (US);
Dustin Burke, Boston, MA (US)

(*) Notice: Subject to any disclaimer, the term of this patent is extended or adjusted under 35 U.S.C. 154(b) by 0 days.

(21) Appl. No.: 17/856,199

(22) Filed: Jul. 1, 2022

(65) Prior Publication Data

US 2023/0004486 A1    Jan. 5, 2023

Related U.S. Application Data

(60) Provisional application No. 63/218,483, filed on Jul. 5, 2021.

(51) Int. Cl.
*G06F 11/00*    (2006.01)
*G06F 8/70*    (2018.01)
*G06F 9/445*    (2018.01)
*G06F 9/455*    (2018.01)
*G06F 11/36*    (2006.01)

(52) U.S. Cl.
CPC ...... *G06F 11/3688* (2013.01); *G06F 11/3664* (2013.01); *G06F 11/3692* (2013.01)

(58) Field of Classification Search
CPC ............ G06F 11/3688; G06F 11/3664; G06F 11/3692; G06F 8/70; G06F 11/3676; G06F 11/368; G06F 8/427; G06F 9/45512; G06F 8/71; G06F 16/148; G06F 11/3672

See application file for complete search history.

(56) References Cited

U.S. PATENT DOCUMENTS

| | | | |
|---|---|---|---|
| 9,489,630 B2 | 11/2016 | Achin et al. | |
| 9,652,714 B2 | 5/2017 | Achin et al. | |
| 10,922,214 B1* | 2/2021 | Nadein | G06F 11/3624 |
| 11,163,731 B1* | 11/2021 | Riddell | G06F 7/5443 |
| 11,334,795 B2 | 5/2022 | Mayer et al. | |
| 11,386,075 B2 | 7/2022 | Schierz et al. | |
| 11,514,369 B2 | 11/2022 | Romanowsky et al. | |

OTHER PUBLICATIONS

Vedpal et al., Role of Machine Learning in Software Testing, 5 pages (Year: 2021).*
Bob Laurent. Our Obsession with Continuous Testing. Mar. 5, 2019 (2 pages). Available at https://www.datarobot.com/blog/our-obsession-with-continuous-testing/.

* cited by examiner

*Primary Examiner* — Thuy Dao
(74) *Attorney, Agent, or Firm* — Greenberg Traurig, LLP; Samuel S. Stone; Andrew J. Tibbetts

(57) ABSTRACT

The system can identify data stored in repositories that indicate changes in the version of the application relative to a prior version of the application tested or deployed before receipt of the request to test the performance of the version of the application. The system can determine, based on the data and using machine learning with historical data associated with applications tested or deployed to test performance of the version, and without execution of the tests, a score for each of a plurality of tests configured to test performance of the version of the application. The system can select, based on the scores, a subset of the tests to execute, and provide an indication of the selected subset of the tests to cause execution of the subset of the tests to evaluate performance of the version of the application prior to deployment of the version of the application.

20 Claims, 9 Drawing Sheets

SOFTWARE TESTING USING MACHINE LEARNING

CROSS-REFERENCES TO RELATED APPLICATIONS

This application claims the benefit of priority under 35 U.S.C. § 119 to U.S. Provisional Patent Application Ser. No. 63/218,483, entitled "SOFTWARE TESTING SYSTEMS AND METHODS," filed Jul. 5, 2021, the contents of such application being hereby incorporated by reference in its entirety and for all purposes as if completely and fully set forth herein.

TECHNICAL FIELD

The present disclosure generally relates to machine learning and data analytics. Portions of the disclosure relate specifically to the application of improved software testing systems and methods to the software development life cycle (SDLC).

BACKGROUND

Software failures are a significant problem for many software users and providers, and for the economy as a whole. Software failures cost the economy US$1.7 trillion in financial losses. Software testing has been important as it not only improves product quality but also accounts for 60% of the total software development cost.

BRIEF SUMMARY OF THE DISCLOSURE

This technical solution is directed at least to an adaptive, artificial intelligence (AI)-driven tool to predict the success or failure of individual tests in a suite of tests available for regression testing. Aspects of this technical solution may select the tests to be performed in response to a "software development unit of request" (e.g., "pull request" or "PR") based on historical data, which may include historical pull requests and the results of previous runs of specific tests. Aspects of this technical solution may include a module (e.g., an adaptive test learner module) interposed between the software testing and deployment modules in a SDLC to reduce software deployment cycle times and testing costs while maintaining high product quality. The adaptive test learner may also inform project planners of quick, easy-to-implement, and/or low cost features that may aid decision makers on the selection of new features to implement. This technical solution can provide technical improvements including at least to 1) predict whether a test executed under a set of specific constraints will succeed with confidence; 2) reduce the human effort involved in regression testing, relative to systems in which humans create test selection rules or manually select tests to run; 3) improve the accuracy of test selection by using advanced predictive analytics rather than rule-based test selection; 4) provide recommendations of "quick win" features (features that were quick and less costly to implement and test) to Project Managers and Planners; and 5) adapt over time by continuously learning using automatic model retraining and feature drift detection.

At least one aspect is directed to a system. The system can include a data processing system. The data processing system can include one or more processors, coupled to memory. The system can receive a request to test performance of a version of an application. The data processing system can identify, responsive to the request, data stored in one or more repositories that indicate changes in the version of the application relative to a prior version of the application tested or deployed before receipt of the request to test the performance of the version of the application. The data processing system can determine, based on the data and via a model trained using machine learning with historical data associated with one or more applications tested or deployed before receipt of the request to test performance of the version, and without execution of the plurality of tests, a score for each of a plurality of tests configured to test performance of the version of the application. The data processing system can select, based at least in part on the score for each of the plurality of tests, a subset of the plurality of tests to execute. The data processing system can provide an indication of the selected subset of the plurality of tests to cause execution of the subset of the plurality of tests to evaluate performance of the version of the application prior to deployment of the version of the application.

At least one aspect is directed to a method. The method can include receiving, by a data processing system with memory and one or more processors, a request to test performance of a version of an application. The method can include identifying, by the data processing system, responsive to the request, data stored in one or more repositories that indicate changes in the version of the application relative to a prior version of the application tested or deployed before receipt of the request to test the performance of the version of the application. The method can include determining, by the data processing system, based on the data and via a model trained using machine learning with historical data associated with one or more applications tested or deployed before receipt of the request to test performance of the version, and without execution of the plurality of tests, a score for each of a plurality of tests configured to test performance of the version of the application. The method can include selecting, by the data processing system based at least in part on the score for each of the plurality of tests, a subset of the plurality of tests to execute. The method can include providing, by the data processing system, an indication of the selected subset of the plurality of tests to cause execution of the subset of the plurality of tests to evaluate performance of the version of the application prior to deployment of the version of the application.

At least one aspect is directed to a non-transitory computer-readable medium storing instructions that can be executed by one or more processors, the cause the one or more processors. The one or more processors can receive a request to test performance of a version of an application. The one or more processors can identify, responsive to the request, data stored in one or more repositories that indicate changes in the version of the application relative to a prior version of the application tested or deployed before receipt of the request to test the performance of the version of the application. The one or more processors can determine, based on the data and via a model trained using machine learning with historical data associated with one or more applications tested or deployed before receipt of the request to test performance of the version, and without execution of the plurality of tests, a score for each of a plurality of tests configured to test performance of the version of the application. The one or more processors can select, based at least in part on the score for each of the plurality of tests, a subset of the plurality of tests to execute. The one or more processors can provide an indication of the selected subset of the plurality of tests to cause execution of the subset of the plurality of tests to evaluate performance of the version of the application prior to deployment of the version of the application.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

Figure 1:
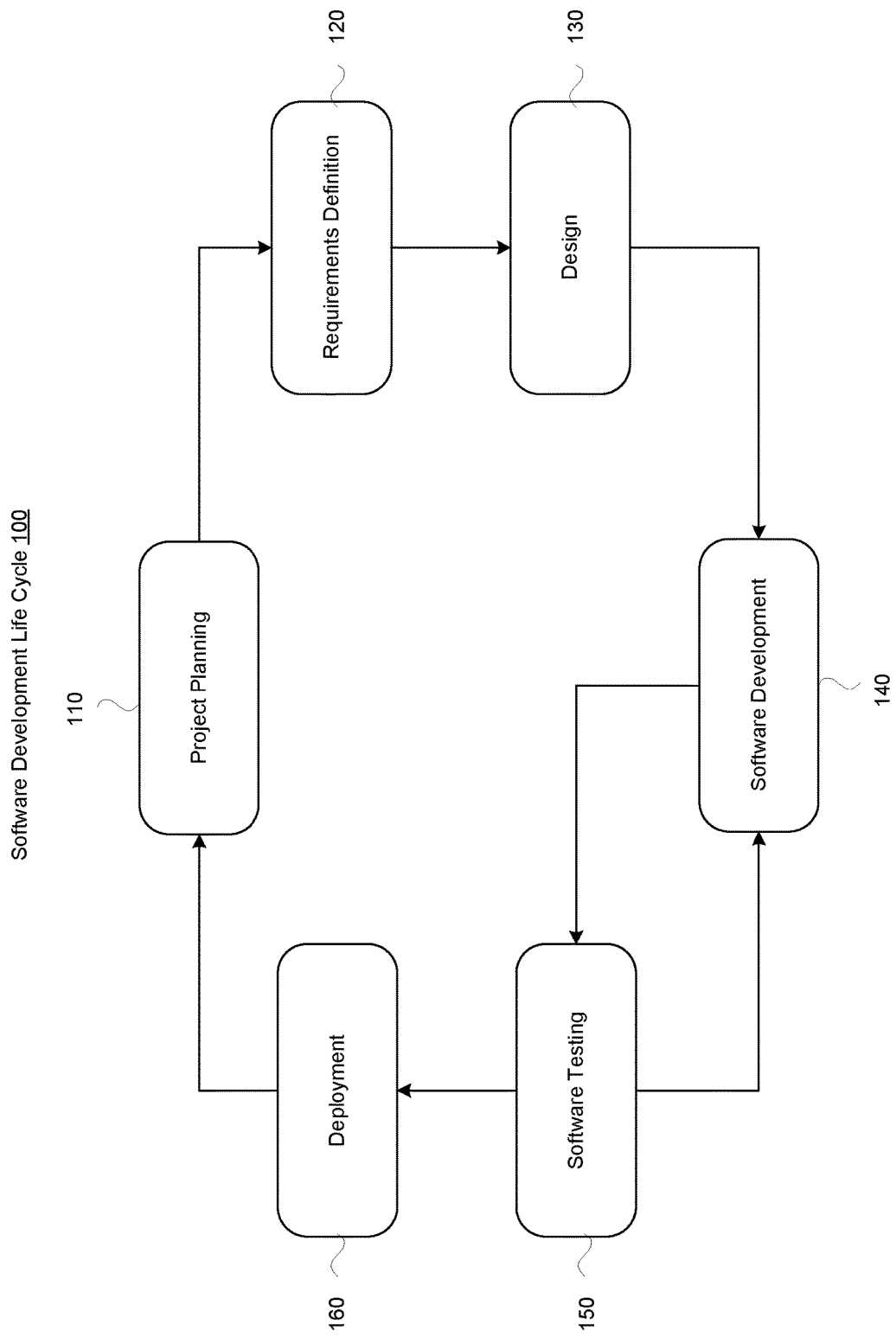
FIG. 1 shows a block diagram of an exemplary software development life cycle (SDLC) for a software application.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

Automated machine learning technology can refer to technology that can be used to automate some or all of the portions of the process of developing data analytics tools. Automated machine learning technology can lower the barriers to the development of certain types of data analytics tools, particularly those that operate on time-series data, structured and unstructured textual data, categorical data, and numerical data. Regression testing can determine whether software development activities (e.g., introduction of new software modules or modification of existing software modules) have fixed known bugs and/or introduced new bugs into software. Such regression testing of software is often automated. Although automation of testing can have a high initial implementation cost, it can provide positive effects on software quality increase the overall effectiveness of the testing process.

Data analytics can refer to the process of analyzing data (e.g., using machine learning models or techniques) to discover information, draw conclusions, and/or support decision-making. Species of data analytics can include descriptive analytics (e.g., processes for describing the information, trends, anomalies, etc. in a data set), diagnostic analytics (e.g., processes for inferring why specific trends, patterns, anomalies, etc. are present in a data set), predictive analytics (e.g., processes for predicting future events or outcomes), and prescriptive analytics (processes for determining or suggesting a course of action).

Machine learning can refer to or include the application of certain techniques (e.g., pattern recognition and/or statistical inference techniques) by computer systems to perform specific tasks. Machine learning techniques (automated or otherwise) may be used to build data analytics models based on sample data (e.g., "training data") and to validate the models using validation data (e.g., "testing data"). The sample and validation data may be organized as sets of records (e.g., "observations" or "data samples"), with each record indicating values of specified data fields (e.g., "independent variables," "inputs," "features," or "predictors") and corresponding values of other data fields (e.g., "dependent variables," "outputs," or "targets"). Machine learning techniques may be used to train models to infer the values of the outputs based on the values of the inputs. When presented with other data (e.g., "inference data") similar to or related to the sample data, such models may accurately infer the unknown values of the targets of the inference data set.

A feature of a data sample may be a measurable property of an entity (e.g., person, thing, event, activity, etc.) represented by or associated with the data sample. In some cases, a feature of a data sample is a description of (or other information regarding) an entity represented by or associated with the data sample. A value of a feature may be a measurement of the corresponding property of an entity or an instance of information regarding an entity. In some cases, a value of a feature can indicate a missing value (e.g., no value). For instance, in the above example in which a feature is the price of a house, the value of the feature may be 'NULL', indicating that the price of the house is missing.

Features can also have data types. For instance, a feature can have a numerical data type, a categorical data type, a time-series data type, a text data type (e.g., a structured text data type or an unstructured ("free") text data type), an image data type, a spatial data type, or any other suitable data type. In general, a feature's data type is categorical if the set of values that can be assigned to the feature is finite.

Time-series data can refer to data collected at different points in time. For example, in a time-series data set, each data sample may include the values of one or more variables sampled at a particular time. In some embodiments, the times corresponding to the data samples are stored within the data samples (e.g., as variable values) or stored as metadata associated with the data set. In some embodiments, the data samples within a time-series data set are ordered chronologically. In some embodiments, the time intervals between successive data samples in a chronologically-ordered time-series data set are substantially uniform.

Time-series data may be useful for tracking and inferring changes in the data set over time. In some cases, a time-series data analytics model (or "time-series model") may be trained and used to predict the values of a target Z at time t and optionally times t+1, . . . , t+i, given observations of Z at times before t and optionally observations of other predictor variables P at times before t. For time-series data analytics problems, the objective is generally to predict future values of the target(s) as a function of prior observations of all features, including the targets themselves.

Image data can refer to one or more of a sequence of digital images (e.g., video), a set of digital images, a single digital image, and one or more portions of any of the foregoing. A digital image may include an organized set of picture elements ("pixels"). Digital images may be stored in computer-readable file. Any suitable format and type of digital image file may be used, including but not limited to raster formats (e.g., TIFF, JPEG, GIF, PNG, BMP, etc.), vector formats (e.g., CGM, SVG, etc.), compound formats (e.g., EPS, PDF, PostScript, etc.), and/or stereo formats (e.g., MPO, PNS, JPS, etc.).

Non-image data can refer to or include any type of data other than image data, including but not limited to structured textual data, unstructured textual data, categorical data, and/or numerical data. Natural language data can refer to speech signals representing natural language, text (e.g., unstructured text) representing natural language, and/or data derived therefrom. Speech data can refer to speech signals (e.g., audio signals) representing speech, text (e.g., unstructured text) representing speech, and data derived therefrom. Auditory data can refer to audio signals representing sound and/or data derived therefrom.

Spatial data can refer to or include data relating to the location, shape, and/or geometry of one or more spatial objects. A spatial object may be an entity or thing that occupies space and/or has a location in a physical or virtual environment. A spatial object may be represented by an image (e.g., photograph, rendering, etc.) of the object. A spatial object may be represented by one or more geometric elements (e.g., points, lines, curves, and/or polygons), which may have locations within an environment (e.g., coordinates within a coordinate space corresponding to the environment).

A spatial attribute can refer to or include an attribute of a spatial object that relates to the object's location, shape, or geometry. Spatial objects or observations may also have non-spatial attributes. For example, a residential lot is a spatial object that that can have spatial attributes (e.g., location, dimensions, etc.) and non-spatial attributes (e.g., market value, owner of record, tax assessment, etc.). A spatial feature can refer to a feature that is based on (e.g., represents or depends on) a spatial attribute of a spatial object or a spatial relationship between or among spatial objects. A location feature can refer to a spatial feature that is based on a location of a spatial object. A spatial observation can refer to an observation that includes a representation of a spatial object, values of one or more spatial attributes of a spatial object, and/or values of one or more spatial features.

Spatial data may be encoded in vector format, raster format, or any other suitable format. In vector format, each spatial object is represented by one or more geometric elements. In this context, each point has a location (e.g., coordinates), and points also may have one or more other attributes. Each line (or curve) comprises an ordered, connected set of points. Each polygon comprises a connected set of lines that form a closed shape. In raster format, spatial objects are represented by values (e.g., pixel values) assigned to cells (e.g., pixels) arranged in a regular pattern (e.g., a grid or matrix). In this context, each cell represents a spatial region, and the value assigned to the cell applies to the represented spatial region.

Data (e.g., variables, features, etc.) having certain data types, including data of the numerical, categorical, or time-series data types, are generally organized in tables for processing by machine-learning tools. Data having such data types may be referred to collectively herein as tabular data (or tabular variables, tabular features, etc.). Data of other data types, including data of the image, textual (structured or unstructured), natural language, speech, auditory, or spatial data types, may be referred to collectively herein as non-tabular data (or non-tabular variables, non-tabular features, etc.).

A data analytics model can refer to or include any suitable model artifact generated by the process of using a machine learning algorithm to fit a model to a specific training data set. The terms data analytics model, machine learning model and machine learned model can be used interchangeably herein.

Development of a machine learning model can refer to construction of the machine learning model. Machine learning models may be constructed by computers using training data sets. Thus, development of a machine learning model may include the training of the machine learning model using a training data set. In some cases (generally referred to as supervised learning), a training data set used to train a machine learning model can include known outcomes (e.g., labels or target values) for individual data samples in the training data set. For example, when training a supervised computer vision model to detect images of cats, a target value for a data sample in the training data set may indicate whether or not the data sample includes an image of a cat. For example, in unsupervised learning, a training data set does not include known outcomes for individual data samples in the training data set.

Following development, a machine learning model may be used to generate inferences with respect to inference data sets. For example, following development, a computer vision model may be configured to distinguish data samples including images of cats from data samples that do not include images of cats. As used herein, the "deployment" of a machine learning model may refer to the use of a developed machine learning model to generate inferences about data other than the training data.

A modeling blueprint (or blueprint) can refer to a computer-executable set of data processing operations and modeling operations that, when executed, extract model features from a data set and perform one or more modeling tasks using the extracted features. Blueprints may be generated "on-the-fly" based on any suitable information including, without limitation, the size of the user data, features types, feature distributions, etc. Blueprints may be capable of jointly using multiple (e.g., all) data types. In some examples, a blueprint may be used to develop a machine-learning model (e.g., to train and validate the model). In some examples, a blueprint may be used to deploy a trained machine-learning model.

In some embodiments, a blueprint may include a set of data processing steps and machine learning (or artificial intelligence) operations that a platform uses to uncover relationships, patterns, insights, and/or predictions from data, leading to great flexibility. In some embodiments, a blueprint includes feature engineering module(s), model training module(s), model tuning module(s), and/or other suitable modules.

Data analysis tools may use feature importance analysis to determine the significance of particular features to particular models (e.g., the extent to which a particular model relies on a particular feature to estimate or predict values of a target variable). Determining the feature importance of various features may involve permutation importance analysis.

As the complexity of technology and software increases, the number of tests performed to validate the interactions of new functionality with existing functionality can increase rapidly (e.g., exponentially). Test volume can become a bottleneck for rapid development and directly limit engineering velocity. Managing a large automated regression test suite generally involves large-scale human effort and running an entire test suite to validate every change in a software application can be costly, time-consuming and inefficient. Such inefficiency tends to increase with product growth, headcount growth and development velocity. Specific software and platforms are generally used to run these automated regression tests, for example, Jenkins, GitLab, TeamCity, and GitHub, and maintaining a seamless integration between the various platforms and the testing suite can be costly and time-consuming. As the software development team grows, the software application increases in size and complexity, and the testing platforms evolve, instabilities are introduced into the testing process and "flakes" (e.g., random unrelated failures) are observed. The more flakes there are, the more tests are rerun therefore increasing both testing time and costs.

Reducing the number of tests performed to validate changes in a software application can alleviate the above-described bottlenecks and inefficiencies. To reduce the time and cost of regression testing, rules and heuristics may be used to select a subset of the available tests to validate a particular batch of changes to the software, thereby limiting the number of tests performed. However, in practice, such rule-based systems tend to be difficult to scale and maintain. Over time, as more software features are added to an application, there is an increased difficulty in selecting a small yet sufficient set of regression tests that cover the changes and the overall system interactions to reliably detect software defects. In many cases, rule-based selection systems become too complex for a human to understand, and the test selection rules tend to be overly conservative, in the sense that they select more tests than necessary to avoid missed detections of software defects.

Thus, this technical solution is directed to software testing techniques using machine learning and can improve the selection of tests for regression testing. The present disclosure describes methods and systems for using an adaptive, artificial intelligence (AI)-driven tool to predict the success or failure of individual tests in a suite of tests available for regression testing. If the model predicts, with confidence, that a specific test will pass, then the specific test may be skipped or automatically deployed; otherwise the specific test may be performed. In this way, the number of tests performed to validate changes in an application may be reduced.

Improved software testing techniques are disclosed. Data analytics tools are used to guide decision-making and/or to control systems in a wide variety of fields and industries, e.g., security; transportation; fraud detection; risk assessment and management; supply chain logistics; development and discovery of pharmaceuticals and diagnostic techniques; and energy management. Historically, the processes used to develop data analytics tools suitable for carrying out specific data analytics tasks generally have been expensive and time-consuming, and often have required the expertise of highly-trained data scientists. Such processes generally includes steps of data collection, data preparation, feature engineering, model generation, and/or model deployment.

In some embodiments, the AI tool may select the tests to be performed in response to a "software development unit of request" (e.g., "pull request" or "PR") based on historical data, which may include historical pull requests and the results of previous runs of specific tests.

Some embodiments may include a module (e.g., adaptive test learner module) interposed between the software testing and deployment modules in a SDLC to reduce software deployment cycle times and testing costs while maintaining high product quality. The adaptive test learner may also inform project planners of quick, easy-to-implement, and/or low cost features that may aid decision makers on the selection of new features to implement.

In some embodiments, the AI tool may include data extraction and preparation modules, one or more machine learned models (e.g., models trained on historical test data) with natural language processing capabilities, a historical test database for storing the data (e.g., new scoring data and/or training data), a test selector, and/or automatic model retrain (or rebuild) systems. In some embodiments, the test selector may determine whether to perform a test, skip the test, or automatically deploy the test based on the tool's confidence that the test will pass or fail, a confidence level (or threshold), and a set of guard rail checks (e.g., rules). The test selector may also include details of costs and run times for project planners.

Some embodiments may be applicable to testing practices in non-software industries (e.g., semiconductor fabrication, chip verification, and/or other suitable industries).

Some embodiments may 1) predict whether a test executed under a set of specific constraints will succeed with confidence; 2) reduce the human effort involved in regression testing, relative to systems in which humans create test selection rules or manually select tests to run; 3) improve the accuracy of test selection by using advanced predictive analytics rather than rule-based test selection; 4) provide recommendations of "quick win" features (features that were quick and less costly to implement and test) to Project Managers and Planners; and 5) adapt over time by continuously learning using automatic model retraining and feature drift detection.

Some embodiments may address one or more of the following specific problems with rule-based testing systems. For example, rule-based software testing may account for approximately 40% to 50% of total project resources, 30% of the total project effort and 50% to 60% of the total cost of software development. As software becomes increasingly complex with the addition of new features, these figures are likely to increase. Some embodiments of an intelligent, adaptive, automated testing system may decrease the amount of human effort, costs and time associated with validating and deploying software.

For example, with conventional approaches to regression testing, a large number of historical tests may be executed on every system change, even though the change may not be relevant to large portions of the overall system. Rule-based test selection techniques may reduce the number of tests to be executed by a ratio of 10% to 15%, whereas some embodiments may reduce the number of executed tests by 30% to 50%. Some embodiments produce advantages such as cost savings in cloud resources, reduced number of tests, reduced test runtime, and reduced the flake rate by ~50%.

For example, most software is dependent on external libraries, for example, Python modules. When these external modules are upgraded, parts of the software that rely on those modules may also be modified. When these types of system upgrades happen, some tests become obsolete and new tests are written. In most cases, due to the dynamic nature of a software application, knowledge of some of the test components may be sparse and the obsolete tests may not be decommissioned out of an abundance of caution. In contrast, by using a predictive analytics model, some embodiments reliably identify obsolete tests and prioritize those tests for decommissioning.

FIG. 1 is a block diagram of an exemplary software development life cycle (SDLC) 100 for a software application, according to some examples. The SDLC 100 may be used by a software developer to design, develop and/or test software applications and to achieve goals by identifying and fixing inefficiencies and higher costs. In some cases, the SDLC 100 may include steps of project planning 110, requirements definition 120, design 130, software development 140, software testing 150, and software deployment 160. In other examples, a SDLC may further include other steps and/or omit one or more steps illustrated in FIG. 1 depending on the scope of a project.

At project planning step 110, a project planner may evaluate the terms of a project. For example, the evaluation may include calculating labor and material costs, creating a timetable with target goals, creating the project's teams and leadership structure, gathering feedback (for example, from stakeholders, potential customers, developers, subject matter experts, and sales representatives), etc. A project planner may define the scope and purpose of the application to be developed, plot the course and provisions for a team to effectively create the software, and/or set boundaries to help keep the project from expanding or shifting from its original purpose.

At requirements definition step 120, the application's specifications (e.g., functionality, performance characteristics, etc.) may be defined. For example, a social media application's functional requirements may include the ability to connect with a friend. In some examples, defining the project's requirements may also include defining the resources to be used to develop the software. For example, if software to control a custom manufacturing machine is being developed, the project's requirements will likely include access to the machine.

At design step 130, a developer may design the software application. The software's design may include aspects of its architecture, user interface, platforms, programming language and methods, communications, and security. In some examples, the design step may include development of a prototype, such as an early version of the software demonstrating some aspects of the application's appearance and functionality, for further improvement.

At software development step 140, a developer (e.g., a development team) may write and rewrite programs that, when executed, provide the application's functionality in accordance with the requirements defined at step 120 and the design decisions made at step 130.

At software testing step 150, a developer may test individual parts of an application, sets of interacting parts of an application, and/or the application as a whole before making the application (or parts of the application) available to users to confirm that the application operates correctly. The testing may help reduce the number of bugs and glitches that users encounter, resulting in higher user satisfaction and/or increased adoption of the software. In some examples, the testing (for example, security testing) may be automated. In some examples, the testing may be performed in a specific environment.

In some examples, the software testing step 150 may run concurrently with the software development step 140. For example, developers may write or modify programs to fix errors detected during testing. In some cases, the software testing step 150 and the software development step 140 may be performed iteratively (or concurrently) until the errors detected in the testing step satisfy certain constraints (e.g., the number of errors is less than a threshold number, the number of critical errors is less than a threshold number, etc.).

At deployment step 160, the application may be made available to users. For example, an application may be deployed on a website, through an application that can be downloaded on a smartphone, etc.

Figure 2:
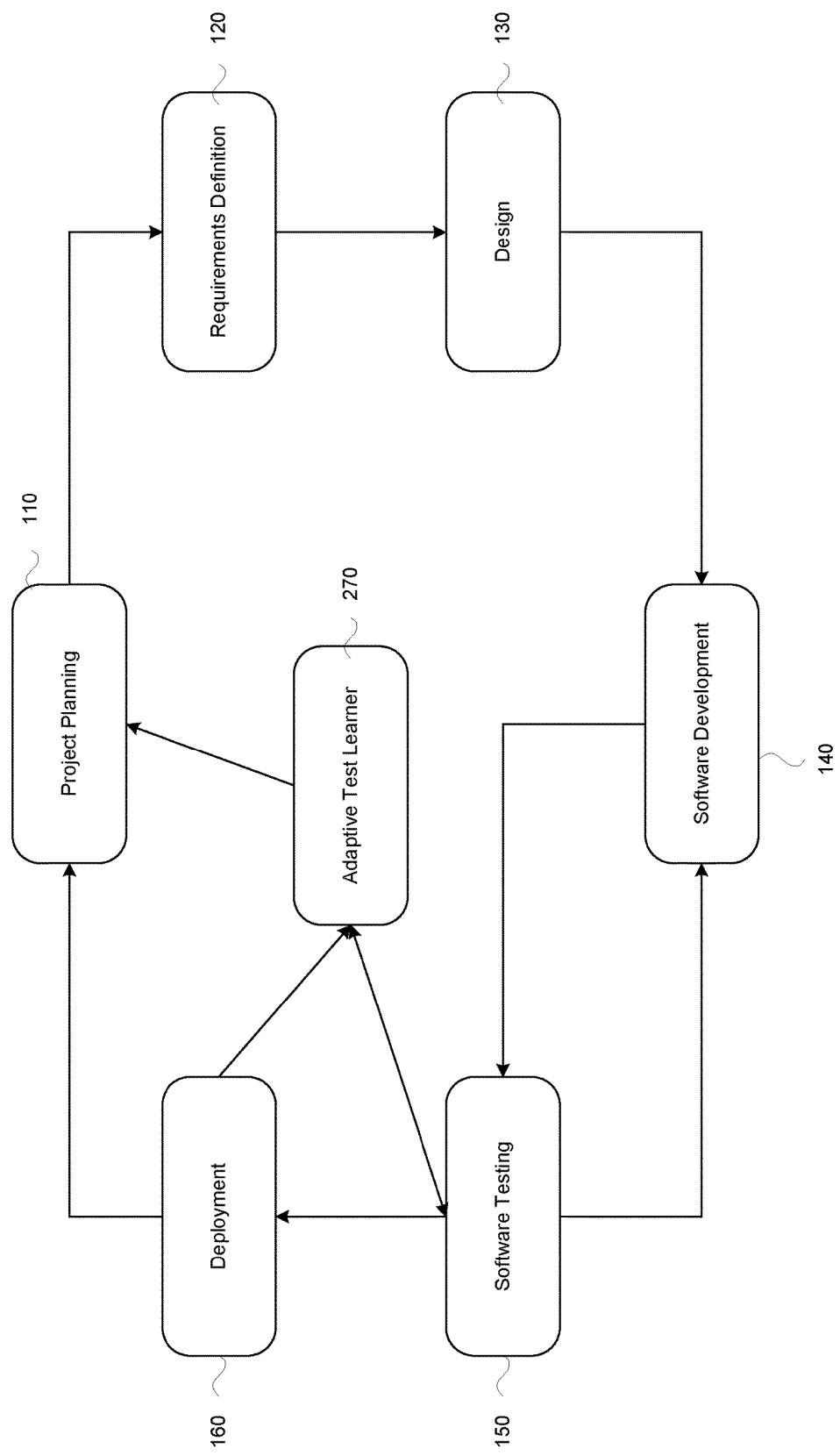
FIG. 2 shows a block diagram of an improved SDLC, according to some embodiments.

FIG. 2 is an a block diagram of an improved SDLC 200 for a software application, according to some embodiments. Compared with an SDLC 100, SDLC 200 may use an adaptive test learner module 270 to improve the software development life cycle (e.g., by reducing software deployment cycle times and/or testing costs while maintaining high product quality). In some embodiments, the adaptive test learner module 270 may provide information regarding the extent of the testing that would be recommended if a new feature were added to the application, which may aid decision makers in determining whether potential new features can be implemented quickly and/or at low cost. In some embodiments, the adaptive test learner module 270 may be used during the software development 140, software testing 150, and/or deployment steps 160, as described in further detail below.

Figure 3:
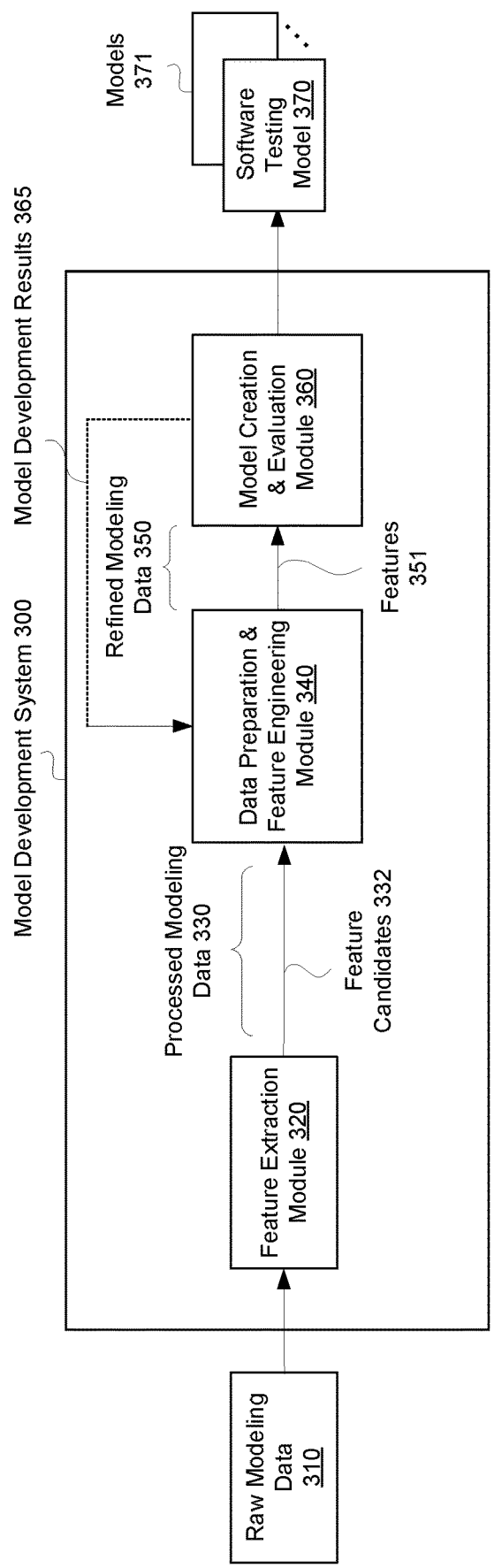
FIG. 3 shows a block diagram of a model development system for developing a software testing model, according to some embodiments.

FIG. 3 is a block diagram of a model development system 300 for developing a software testing model 370, according to some embodiments. The above-described adaptive test learner module 270 may comprise the software testing model 370. The model development system 300 may include a feature extraction module 320, a data preparation and feature engineering module 340, and a model creation and evaluation module 360. In some embodiments, the model development system 300 receives raw modeling data 310 and uses the raw modeling data 310 to develop (e.g., automatically develop) one or more software testing models 370 (e.g., machine learning models, etc.) that can predict whether specific tests for a software application under development will pass or fail based on data relating to the tests and the software development project. Some embodiments of the components and functions of the model development system 300 are described in further detail below. The software testing model 370 can be one or a subset of a plurality of models 371. The model development system 300 can store the software testing model 370 to a physical or logical location corresponding to the models 371. The model development system 300 can generate a plurality of models 371, where the plurality of generated models 371 includes the software testing model 370.

The raw modeling data 310 may include any data suitable for training or validating a software testing model 370. Some examples of suitable modeling data are described below with reference to FIG. 5.

In some embodiments, the feature extraction module 320 performs data pre-processing and data feature extraction on the raw modeling data 310, and provides the extracted features to the data preparation and feature engineering module 340 as feature candidates 332 within a processed modeling dataset 330.

In some embodiments, the data preparation and feature engineering module 340 automatically assembles the processed modeling data 330 into a modeling table. Optionally, the data preparation and feature engineering module 340 may perform automatic exploratory data analysis on the modeling data. In such instances, automatic exploratory data analysis may include, without limitation, identifying the data types of the feature candidates 332 (e.g., numeric, categorical, date/time, text, image, location (geospatial), etc.) and/or determining basic descriptive statistics for one or more (e.g., all) features candidates 332. The results of such exploratory data analysis may help the user verify that the system has understood the uploaded data correctly and identify data quality issues early.

In some embodiments, the data preparation and feature engineering module 340 partitions the modeling data 330 into a training set, a validation set, and a holdout set. Alternatively, the data partitioning module may partition the modeling data 330 into multiple cross-validation sets (or "folds") and a holdout set.

The data preparation and feature engineering module 340 may perform data preparation and/or feature engineering operations on the processed modeling data 330. The data preparation operations may include, for example, characterizing the input data. Characterizing the input data may include detecting missing observations, detecting missing variable values, and/or identifying outlying variable values. In some embodiments, characterizing the input data includes detecting duplicate portions of the modeling data 330 (e.g., observations, spatial objects, images, etc.). If duplicate portions of the modeling data 330 are detected, the model development system 300 may notify a user of the detected duplication.

In some embodiments, the data preparation and feature engineering module 340 also performs feature selection operations (e.g., dropping uninformative features, dropping highly correlated features, replacing original features with top principal components, etc.). The data preparation and feature engineering module 340 may provide refined modeling data 350 with a curated (e.g., analyzed, engineered, selected, etc.) set of features 351 to the model creation and evaluation module 360 for use in creating and evaluating models. In some embodiments, the data preparation and feature engineering module 340 determines the importance (e.g., feature importance) or feature impact of the individual feature candidates 332 and/or individual engineered features derived therefrom, and selects a subset of those feature candidates (e.g., the N most important feature candidates, all feature candidates having importance scores above a threshold value, etc.) as the features 351 used by the model creation and evaluation module 360 to generate and evaluate one or more models.

The model creation and evaluation module 360 may create one or more models and evaluate the models to determine how well (e.g., accurately) they solve the data analytics problem at hand (e.g., predicting whether specific tests for a software application under development will pass or fail). In some embodiments, the model creation and evaluation module 360 performs model-fitting steps to fit models to the training data (e.g., to the features 351 of the refined modeling data 350). The model-fitting steps may include, without limitation, algorithm selection, parameter estimation, hyperparameter tuning, scoring, diagnostics, etc. The model creation and evaluation module 360 may perform model fitting operations on any suitable type of model, including (without limitation) decision trees, neural networks, support vector machine models, regression models, boosted trees, random forests, deep learning neural networks, k-nearest neighbors models, naïve Bayes models, etc. In some embodiments, the model creation and evaluation module 360 performs post-processing steps on fitted models. Some non-limiting examples of post-processing steps may include calibration of predictions, censoring, blending, choosing a prediction threshold, etc.

In some embodiments, the data preparation and feature engineering module 340 and the model creation and evaluation module 360 form part of an automated model development pipeline, which the model development system 300 uses to systematically evaluate the space of potential solutions to the data analytics problem at hand. In some cases, results 365 of the model development process may be provided to the data preparation and feature engineering module 340 to aid in the curation of features 351. Some non-limiting examples of systematic processes for evaluating the space of potential solutions to data analytics problems are described in U.S. patent application Ser. No. 15/331,797 (now U.S. Pat. No. 10,366,346).

During the process of evaluating the space of potential modeling solutions for a data analytics problem, some embodiments of the mod& creation and evaluation module 360 may allocate resources for evaluation of modeling solutions based in part on the feature importance scores of the features in the dataset (e.g., refined modeling data 350) representing the data analytics problem. In general, the model creation and evaluation module 360 may select or suggest potential modeling solutions that are predicted to be suitable or highly suitable for a dataset. When determining the suitability of a predictive modeling procedure for a data analytics problem, the model creation and evaluation module 360 may treat the characteristics of the more important features of the dataset as the characteristics of the data analytics problem. In this way, the model creation and evaluation module 360 may generate "suitability scores" for potential modeling solutions, such that the suitability scores are tailored to the more important features of the dataset. The model creation and evaluation module may then allocate computational resources to model training and evaluation tasks based on those suitability scores, Thus, tailoring the suitability scores to the more important features of the dataset may result in resources being allocated to the evaluation of potential modeling solutions based in part on feature importance scores.

In some embodiments, the model creation and evaluation module 360 selects models for blending based on the feature importance scores, and blends the selected models. The model creation and evaluation module 360 may use any suitable technique to select models for blending. For example, "complementary top models" may be selected for blending. In this context, "complementary top models" may include high-performing models that achieve their high performance (e.g., high accuracy) through different mechanisms. The model creation and evaluation module 360 may classify a model as a "top" model if a score representing the model's performance is greater than a threshold, if the model has one of the N highest scores among the fitted models, if the model does not have one of the M lowest scores among the fitted models, etc. The model creation and evaluation module 360 may classify two models as "complementary" models if (1) the most important features for the models (e.g., the features having the highest feature importance scores for the models) are different, or (2) a feature that has high importance to the first model has low importance to the second model, and a feature that has low importance to the first model has high importance to the second model. In this context, a feature may have "high importance" to a model if the feature has a high feature importance score for the model (e.g., the highest feature importance score, one of the highest N feature importance scores, a feature importance score greater than a threshold value, etc.). In this context, a feature may have "low importance" to a model if the feature has a low feature importance score for the model (e.g., the lowest feature importance score, one of the lowest N feature importance scores, a feature importance score lower than a threshold value, etc.). In some embodiments, the model creation and evaluation module 360 may use the above-described classification techniques to select two or more complementary top models for blending. In some cases, blending complementary top models may yield blended models with very high performance, relative to the component models. By contrast, blending non-complementary models may not yield blended models with significantly better performance than the component models.

In some cases, the model generated by the creation and evaluation module 360 includes a gradient boosting machine (e.g., gradient boosted decision tree, gradient boosted tree, boosted tree model, any other model developed using a gradient tree boosting algorithm, etc.). Gradient boosting machines are generally well-suited to data analytics problems involving heterogeneous tabular data.

In some cases, the model generated by the creation and evaluation module 360 includes a feed-forward neural network, with zero or more hidden layers. Feed forward neural networks are generally well-suited to data analytics problems that involve combining data from multiple domains (e.g., spatial data and image data; spatial data and numeric, categorical, or text data, etc.), pairs of inputs from the same domain (e.g., pairs of spatial datasets, pairs of images, pairs of text samples, pairs of tables, etc.), multiple inputs from the same domain (e.g., spatial datasets, sets of images, sets of text samples, sets of tables, etc.), or combinations of singular, paired, and multiple inputs from a variety of domains (e.g., spatial data, image data, text data, and tabular data).

In some cases, the model generated by the creation and evaluation module 360 includes a regression model, which can generally handle both dense and sparse data. Regression models are often useful because they can be trained more quickly than other models that can handle both dense and sparse data (e.g., gradient boosting machines or feed forward neural networks).

In some embodiments, the model development pipeline tailors its search of the solution space based on the computational resources available to the model development system 300. For example, the model development pipeline may obtain resource data indicating the computational resources available for the model creation and evaluation process. If the available computational resources are relatively modest (e.g., commodity hardware), the model development pipeline may extract feature candidates 332, select features 351, select model types, and/or select machine learning algorithms that tend to facilitate computationally efficient creation and evaluation of modeling solutions. If the computational resources available are more substantial (e.g., graphics processing units (GPUs), tensor processing units (TPUs), or other hardware accelerators), the model development pipeline may extract feature candidates 332, select features 351, select model types, and/or select machine learning algorithms that tend to produce highly accurate modeling solutions at the expense of using substantial computational resources during the model creation and evaluation process.

The system can include the data processing system to receive the request via a graphical user interface presented on a client device remote from the data processing system. The data processing system can provide, via the graphical user interface, the indication of the selected subset of the plurality of tests.

The system can include the data processing system to identify the data stored in the one or more repositories can include at least one of pull request data, issue tracker information, or changed files data. The data processing system can generate, based at least in part on the data, a plurality of features for the version of the application. The data processing system can determine, based on the plurality of features and via the model, the score for each of the plurality of tests configured to test performance of the version of the application.

The system can include the data processing system to identify the data stored in the one or more repositories can include a number of lines of code in the version of the application that have changed relative to the prior version of the application. The system can include the data processing system to identify, from the historical data, a plurality of features. The data processing system can train the model via the machine learning based on the plurality of features and the historical data. The system can include the data processing system to perform pre-processing on raw data associated with the historical data. The data processing system can generate the plurality of features based on the pre-processed raw data. The system can include the data processing system to determine the score for each of the plurality of tests, the score indicating a likelihood that a test of the plurality of tests passes.

The system can determine a score corresponding to one or more tests without execution of the plurality of tests. For example, the system can generate scores based on historical data corresponding to previous versions of the application or previous versions of other applications. For example, the system can generate the score based on one or more aspects of the version of the application based on previous versions of the application or previous versions of other applications, including but not limited to features. For example, the system can determine or generate the score corresponding to a particular version of the application based on data of or metadata corresponding to the particular version of the application. Thus, the system can forgo performance of a test of a version of an application by generating a score at least from features derived based on the version of the application, and independent of execution of the version of the application. Forgoing performance of a test of a version of an application can provide the technical improvement of reducing computational resources required to evaluate and select applications satisfying particular criteria based on structure and operation associated with an application.

The system can include the data processing system to compare the score for each of the plurality of tests with a threshold. The data processing system can group, based on the comparison, the plurality of tests into the subset of the plurality of tests and a second subset of the plurality of tests that is different from the subset of the plurality of tests. The data processing system can assign a first action to perform for the subset of the plurality of tests. The data processing system can assign a second action to perform for the second subset of the plurality of tests, the second action different from the first action. The system where the first action corresponds to execution of the test, and the second action corresponds to skipping the test or automatic deployment of the test.

The system can include the data processing system to determine the score for each of the plurality of tests, the score indicating a likelihood that a test of the plurality of tests passes. The data processing system can select the subset of the plurality of tests based on the score of the subset of the plurality of tests less than a threshold.

The system can include the data processing system to determine the score for each of the plurality of tests, the score indicating a likelihood that a test of the plurality of tests passes. The data processing system can select a second subset of the plurality of tests based on the score of the second subset of the plurality of tests greater than a threshold. The data processing system can skip execution of the second subset of the plurality of tests to reduce computing resource utilization associated with performance testing of the version of the application, where the subset of the plurality of tests is less than the plurality of the tests.

A Blueprint for a Software Testing Model

Figure 4:
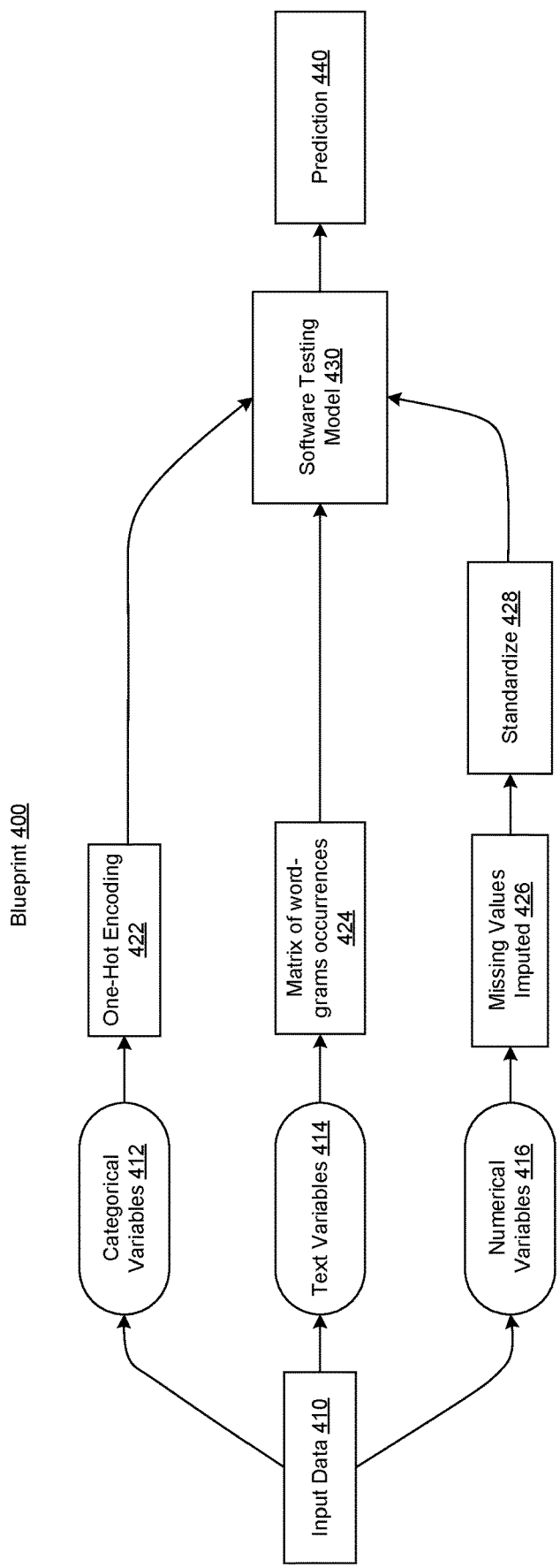
FIG. 4 shows a block diagram of a blueprint for a software testing model, according to some embodiments.

FIG. 4 is a block diagram of a blueprint 400 for a software testing model 430 (e.g., software testing model 370), according to some embodiments. In some examples, the model development system 300 may generate the blueprint 400 and use it to train a machine-learning model 430 to predict whether specific tests for a software application under development will pass or fail based on input data 410 relating to the tests and the software development project. In some examples, a model deployment system 700 may deploy the blueprint 400 to generate predictions 440 indicating whether specific tests for a software application under development will pass or fail based on input data 410 relating to the tests and the software development project.

In the example of FIG. 4, the blueprint 400 includes data processing modules (422, 424, 426, 428) and a software testing model 430, all of which are described in further detail below. When applied to the processed input data, the software testing model 430 may generate a prediction 440 indicating whether specific tests for a software application under development will pass or fail.

The input data 410 may include any data suitable for predicting whether specific tests for a software application under development will pass or fail. Some examples of suitable input data are described below with reference to FIG. 5. In some embodiments, the input data 410 may be divided into categorical variables 412, text variables 414, and numerical variables 416 for processing. Each of the categorical variables 412 may be encoded using a one-hot encoding scheme 422. Each (or all) of the text variables 414 may be encoded as a matrix of word-grams occurrences 424 (e.g., using natural language processing (NLP) techniques). Each of the numerical variables 416 may be processed by imputing missing values 426 and by standardizing 428 the variable values (e.g., converting the raw numeric values to corresponding values on a fixed scale, such as a scale from 0.0 to 1.0).

After the data processing (422, 424, 426, 428), the processed data may be provided as input to the software testing model 430, which may output the corresponding prediction 440. The model 430 may be any suitable model. In some embodiments, the model 430 may be an elastic-net classifier (e.g., with mixing alpha=0.5 or binomial deviance). In some embodiments, the model 430 may be a linear model, while in other embodiments, the model 430 may be a decision tree. In some embodiments, the model 430 may be a binary classification model.

In some embodiments, the prediction 440 may be represented by one or more labels and/or one or more quantitative values (e.g., real numbers between 0 and 1). For example, the prediction 440 may include a label indicating whether a test is predicted to pass or fail, and a quantitative value indicating the model's confidence in the accuracy of the label.

Software Testing System and Methods

Figure 5:
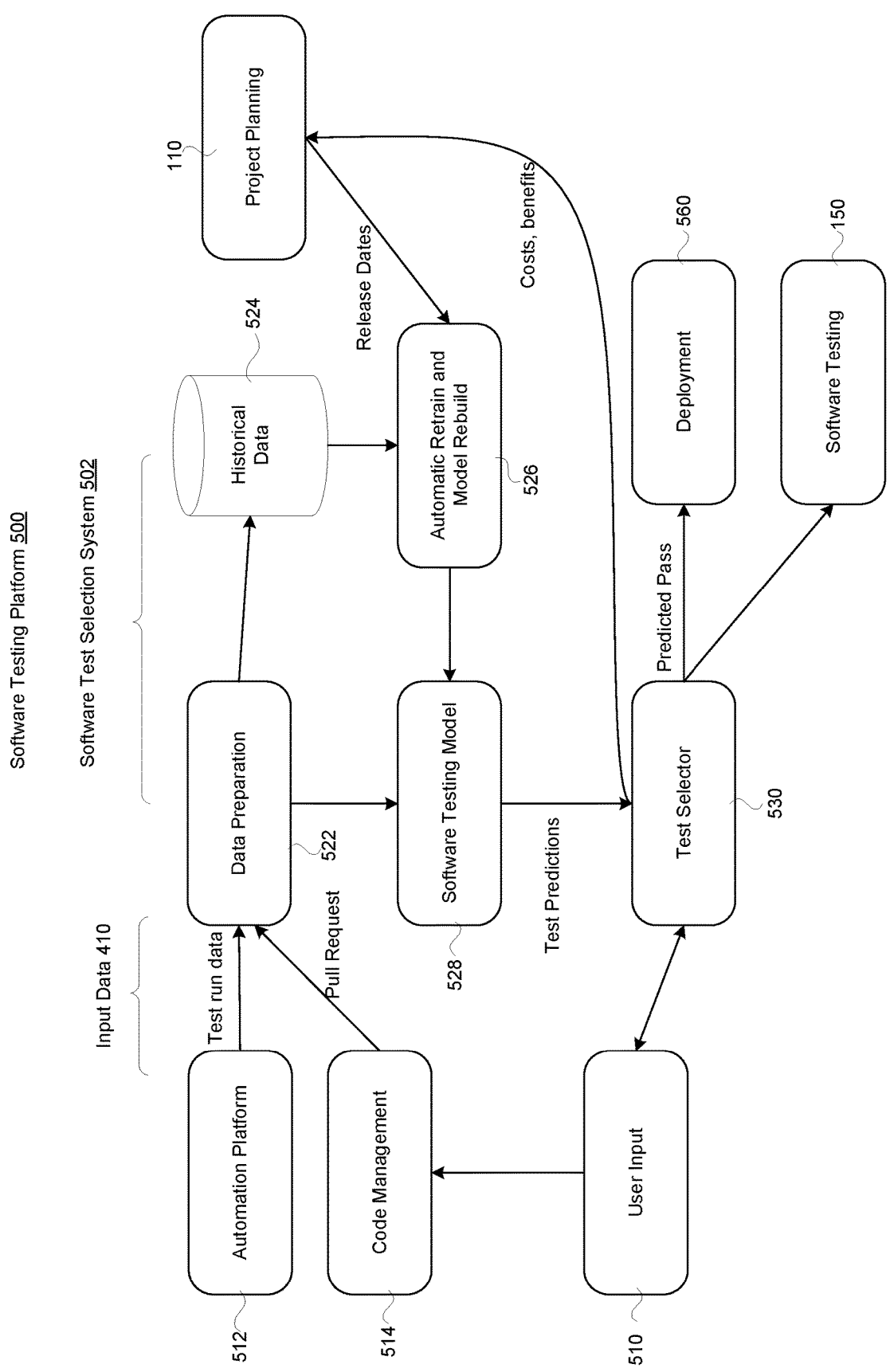
FIG. 5 shows a block diagram of an AI-driven software testing platform, according to some embodiments.

FIG. 5 is a block diagram of an AI-driven software testing platform 500, according to some embodiments. The software testing platform 500 may include a software test selection system 502. The software test selection system 502 may include a data preparation module 522, a software testing model 528, historical data 524, an automatic retraining and model rebuilding module 526, and a test selector module 530. In some embodiments, the data preparation module 522 and software testing model 528 may be provided by a modeling blueprint 400. For example, the data preparation module 522 may perform the data processing operations of a modeling blueprint 400 (e.g., the operations of data processing modules 422-428), and the software testing model 528 may be the software testing model 430 of the modeling blueprint 400.

Inputs to the software test selection system 502 may be provided, for example, by other tools used in the software development process (e.g., a testing automation platform 512, a code management tool 514, etc.) and/or by other data sources. These inputs may include, for example, the input data 410 for a modeling blueprint 400. Other inputs may include information related to the project planning step 110 of the SDLC. Outputs generated by the software test selection system 502 may be provided to other tools used in the software development process (e.g., tools used for software testing 150 and/or for automated test deployment 560). Additional outputs regarding the costs and/or benefits of various tests may be provided to project planners.

In some embodiments, the input data 410 for the software test selection system 502 may include changed files data, pull request data, issue tracker information, and/or other suitable types of data. The changed files data may include data relating to one or more files of a software application (e.g., data files, configuration files, source code files, etc.) that have been changed (e.g., edited, added, or deleted). Such data may include the file names of one or more changed files, modules where the changed files are located, top-level directories where the changed files are located, file extensions of the changed files, etc. The system 502 may infer, based on the file extensions of the changed files, which portions of a software application were involved in a pull request. For example, .if Python files (.py extension) were changed, the system 502 may infer that the changes relate to the application's backend. In another example, if JavaScript files (.js extension) were changed, the system 502 may infer that the application's frontend has changed.

The pull request data may include one or more titles of a pull request, numbers of changed files (which may indicate the complexity of the change), commit data, and/or user data. In some embodiments, the title of a pull request may include words that indicate whether the changes are simple or complex, and the AI model 528 may estimate risk based on that information. In some embodiments, the AI model 528 may infer the complexity of the change based on the number of files changed, the number lines of codes changed, and/or any other suitable metrics. In some embodiments, the commit data may identify the files changed, the person making the changes, and any text (e.g., comments) provided by the user when the change is committed.

In some embodiments, the data preparation module 522 may extract one or more features (e.g., ticket name, project name, summary, issue type, priority, status, resolution, label, acceptance criteria, description of changes, file name, top-level directory name, module name, file extension, a pull request title, etc.) from the pull request data and/or issue tracking data for use by the software testing model 528. These features are described further below.

Ticket name: In some embodiments, the software testing model 528 may infer the scope of the changes associated with a pull request based on the name of the ticket corresponding to the pull request. In some embodiments, the software testing model 528 may infer the risk of the changes breaking a test based on the inferred scope of the changes.

Project name: In some embodiments, the software testing model 528 may infer which software development team is changing the software application based on the project name. In some embodiments, the model 528 may infer the risk of the changes breaking a test based on the team that is making the changes. (Based on historical data, different teams may be more or less likely to break tests (in general, or specific tests) when making changes of comparable scope.)

Summary: The summary of a pull request may include a (e.g., short) description of the changes being made. In some embodiments, the model 528 may infer which parts of the application are affected by the changes based on the summary of the pull request. In some embodiments, the model 528 may infer that the risk of a change breaking a specific test is higher if the test relates to a part of the application affected by the change.

Issue type: The issue type may indicate whether the changes associated with a pull request implement bug fix or a new feature.

File names: Based on the names of the files in which changes have been made, the model 528 may infer that testing of the functionality implemented by some files (e.g., the changed files and files containing code that interacts with the code in the changed files) is warranted and/or that testing of the functionality implemented by other files (e.g., files that have not been changed and files containing no code that interacts with the code in the changed files) is not warranted Top-level directory names: Based on the names of the top-level directories in which the changed files are stored, the model 528 may infer which parts of the software application are likely to be affected by the changes. As discussed above, the model 528 may infer that the risk of a change breaking a specific test is higher if the test relates to a part of the application affected by the change.

In some embodiments, features with high feature importance to the model 528 may include one or more of the following features:

all_modules_joined (a text feature that specifies the names of all the changed modules associated with the pull request), all_top_level_dirs (e.g., a text feature that specifies the names of all the top-level directories containing changed modules associated with the pull request), pr_title (e.g., a text feature indicating the title of the pull request), project_name (e.g., a text feature indicating the name of the software development project), all_file_names (e.g., a text feature that specifies the names of all the changed files associated with the pull request), summary (e.g., the pull request summary), all_file_extensions (e.g., a text feature that specifies the file extensions of all the changed files associated with the pull request), number_of_files_changed (e.g., a numeric feature indicating the number of changed files associated with the pull request, and/or type (e.g., a categorical feature indicating the issue type addressed by the pull request.

In some embodiments, one or more above-mentioned features may be monitored for drift. If drift is detected, the retraining and model rebuilding module 526 may initiate retraining or refreshing of the software testing model 528.

The test selector 530 received predictions and insights sent from the AI model 528 for determining either deployment or selecting a test. In some embodiments, the test selector 530 automatically sends an alert to a developer (e.g., an engineer 510) regarding the decision for a test (e.g., whether a test is predicted to pass or fail, and/or whether the system recommends performing the test, automatically deploying the test, or skipping the test) according to the prediction of the test. The engineer 510 may receive the alert (for example, at some or all times) of the progress through communication channels, such as Slack.

In some embodiments, a default confidence threshold may be 75%, e.g., the prediction of a test has to be greater than 0.75 for the test to be sent for automatic deployment. The threshold may be set by the engineer 510 before running the adaptive test learner 270. Other tests may be executed on the automatic testing platform 512.

Referring to FIG. 5, the test selector 530 may also monitor and collect the results of the tests including the cost savings, and then create at least two reports. One report may be a PR test summary for engineers (e.g. the engineer 510), and another report may be the insights and costs of the tests run for the release cycle for project planning step 110.

In some embodiments, with new features constantly being developed, the life cycle of an AI model for software development may be relatively short and may get outdated in a short amount of time. To combat this, the historical data 524 from the latest release may be added to the training data, and the AI model 528 is rebuilt. The retrain or rebuild may be automatic. The retrain or rebuild may be triggered by release dates provided by the project planners from the project planning step 110, automated drift analysis, and/or other factors.

As described above, a primary purpose of some embodiments is to reduce the number of tests run per pull request by using the AI model 528.

Figure 6:
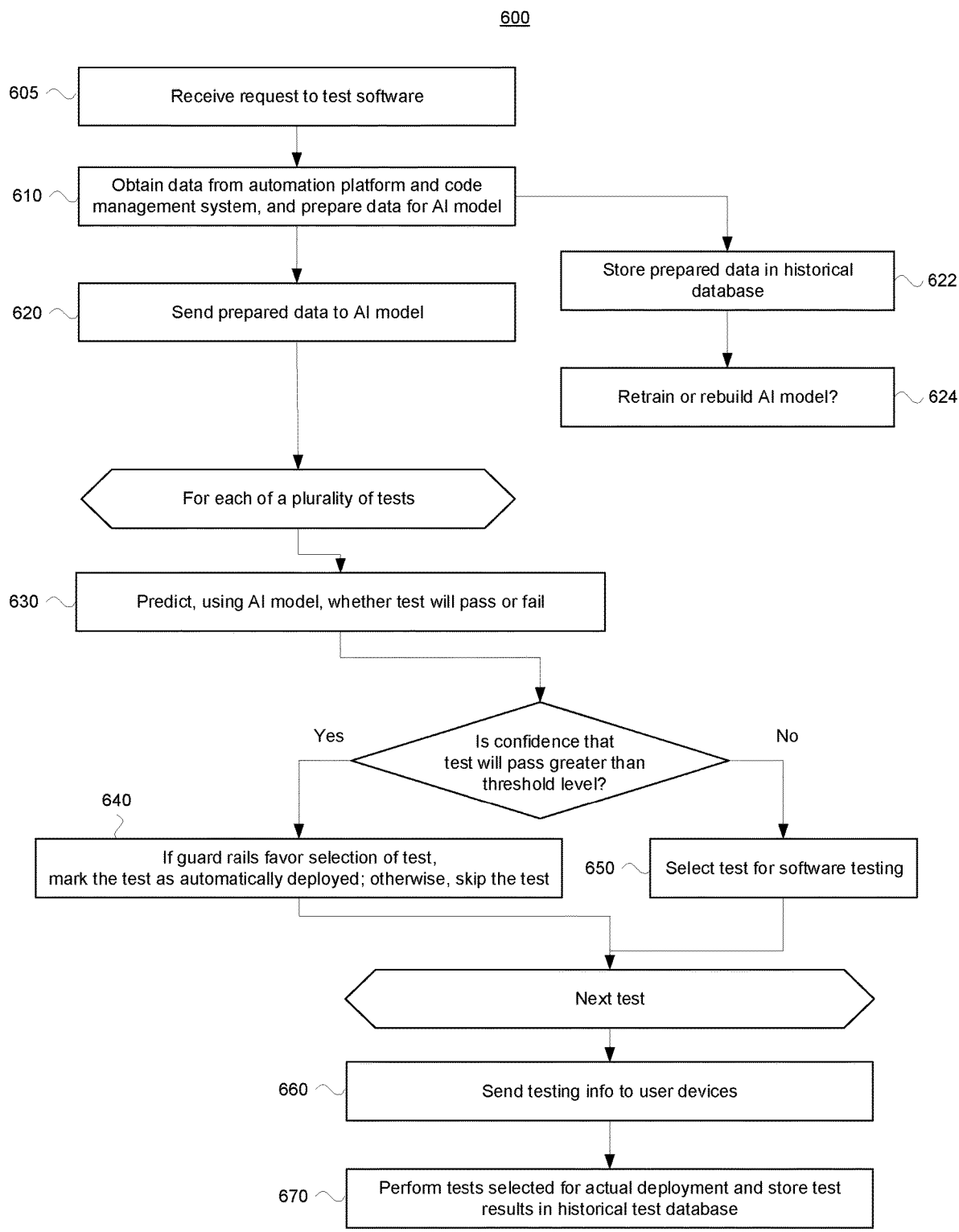
FIG. 6 shows a flowchart of an AI-driven software testing method, according to some embodiments.

FIG. 6 is a flowchart of an AI-driven software testing method 600, according to some embodiments.

At step 605, a software testing system (e.g., a software testing system that includes the software test selection system 502) receives a request to test software.

At step 610, the software testing system obtains data (e.g., raw modeling data) from an automation platform and/or code management system, and prepares the data for use by an AI model (e.g., software testing model 528). In some embodiments, the obtained data includes the input data 410. In some embodiments, the system may obtain at least a portion of the data by automatically extracting test run logs from the automated platform (e.g., Jenkins) and the code management system (e.g., GitHub). In some embodiments, preparing the data for use by the AI model may include creating machine-readable features from the data. Such data preparation may be performed, for example, by the data preparation module 522 of the software test selection system 502.

At step 620, the software testing system may send the prepared data to an AI model (e.g., software testing model 528) for processing. Some embodiments of the processing performed by the software testing model 528 are described below with reference to steps 630-650 of the method 600. In some embodiments, the AI model includes natural language processing capabilities.

At step 622, the software test selection system may store the prepared data in an historical data store 524 (e.g., historical database). In some embodiments, the historical database includes training data suitable for training the AI model (which may include training data and/or validation data previously used to train and/or validate the AI model). In addition or in the alternative, the historical data store 524 may include scoring data (e.g., input data that the AI model previously processed and for which the AI model generated one or more inferences). In some embodiments, that AI model has been trained on at least some of the historical data stored in the historical data store.

In steps 630-650, the software test selection system 502 evaluates a set of tests T (e.g., all available tests for the software under development, or a subset thereof) to determine which tests to perform, which tests to automatically deploy, and which tests to skip. When determining whether to perform, deploy, or skip one or more tests, the system 502 may evaluate tests individually or in groups (e.g., "suites") of two or more. For example, the system 502 may determine that a first test or suite of tests should be performed, that a second test or suite of tests should be deployed, and that a third tests or suite of tests should be skipped. The system's evaluation of the individual tests or suites of tests may be performed sequentially or in parallel.

At step 630, for each of the individual tests or suites of tests in the set of tests T, the AI model (e.g., software testing model 528) predicts the outcome of performing the test (or test suite). For example, for a given test (or test suite), the AI model may generate a value (e.g., confidence score) indicating the predicted probability of the software passing the test (or test suite).

The AI model's prediction may be provided to the system's test selector module 530. The test selector module 530 may then compare the value generated by the AI model to a confidence threshold (or "level") to generate a binary prediction as to whether the test (or test suite) will pass or fail. Any suitable confidence threshold may be used. In some embodiments, the confidence threshold is a probability value between 0.0 and 1.0. In some embodiments, the default value of the confidence threshold is between 0.55 and 0.95 (e.g., 0.75). In some embodiments, the value of the confidence threshold may be set by a user of the software testing system. In some embodiments, the confidence threshold depends on the criticality of the associated tests. In some embodiments, the confidence threshold may be different for groups and/or categories of tests. In some embodiments, the confidence threshold may be different for different phases of testing (e.g., individual testing versus integration testing).

At step 640, if the test selector module 530 predicts, with confidence, that the test (or test suite) will pass (e.g., the AI model's predicted probability of the test or test suite passing is greater than or equal to the test selector module's confidence threshold), then the test selector module 530 may perform guard rail checking (step 640) on the predicted passing test(s) Trp. As used herein, a "guard rail" may include one or more rules, heuristics, set of criteria, processes, and/or or systems configured to select one or more tests to validate a change to the software under development. If the application of one or more guard rails to a predicted passing test indicates that the predicted passing test is selected to validate the changes to the software, the test selector module 530 may designate the predicted passing test for actual deployment (e.g., place the test on a list of tests to be performed) or automatic deployment (e.g., place the test on a list of tests to be automatically deployed). The system may automatically deploy a predicted passing test by adding an entry in the testing logs for the software under development indicating that the test was selected and predictively passed, rather than actually performing the predicted passing test on the changed software. If a predicted passing test is not selected by the guard rails to validate the changes to the software, the test selector module may skip the test rather than actually or automatically deploying it.

Some non-limiting examples of guard rails may include a rule-based test selection system, the rules applied by a rule-based test selection system, a test selection blacklist, a test selection whitelist, a user interface (UX) for manually selecting tests, etc. For example, if the rules of a rule-based test selection system indicate that one or more of the predicted passing tests (or test suites) should be performed to validate the changes to the software under development, the test selector module 530 may designate those tests for actual or automatic deployment. As another example, the test selector module 530 may cross-check the predicted passing tests TPP against a blacklist or whitelist of files in the software development project. If a predicted passing test relates to validation of a file listed on the blacklist, the test selector module 530 may select the test for actual or automatic deployment rather than skipping it. Likewise, if a predicted passing test relates to validation of a file not listed on the whitelist, the test selector module 530 may select the test for actual or automatic deployment rather than skipping it.

As yet another example, the test selector module 530 may present a test selection user interface (UX) whereby a user (e.g., developer) can provide input directing the system to override the current designation of a test (as being selected for actual deployment, automatic deployment, or skipped). For example, the UX may identify one or more (e.g., all) predicted passing tests, describe the AI model's prediction with respect to the test (e.g., the confidence score generated by the AI model for the test), indicate the outcomes of any other guard rail checks applied to the test, indicate the test's current designation, etc. Through the user interface, the user may provide input related to the designations of one or more of the predicted passing tests. Based on such input, the system may change the designation of one or more of the predicted passing tests. In some embodiments, when the user provides input via the UX requesting a change to a test's designation, the system may permit the requested change to the test's designation only if that change decreases the testing risk (e.g., if the requested change in designation is from "skipped" to "actual deployment" or "automatic deployment", or from "automatic deployment" to "actual deployment"), while prohibiting any change to a test's designation that increases the testing risk (e.g., a change in designation from "actual deployment" to "automatic deployment" or "skipped", or from "automatic deployment" to "skipped").

The test selector module 530 may be configured to apply all available guard rails to all predicted passing tests $T_{PP}$, or to selectively apply the available guard rails to specific predicted passing tests TPP based on suitable criteria. For example, the test selector module 530 may apply rules-based guard rails, blacklist-based guard rails, and/or whitelist-based guard rails to all predicted passing tests. In some embodiments, the test selector module 530 may permit a user to override the system's designation of a test through the test selection user interface only if the user is a project manager or has been delegated the rights to override the system's test designations by a project manager.

At step 650, if the test selector module 530 predicts that a test (or test suite) will fail (e.g., the prediction is not greater, e.g., lower than the confidence threshold), then the test selector module 650 may designate the test for actual deployment (e.g., select the test for software testing).

At step 660, the software test selection system 502 may send information in one or more communications regarding test selection (for example, details of costs and run times) to notify desired target users, such as project planners. For example, the system may send a digital communication to a client device or present a user interface on the client device, which may (1) identify the available tests, (2) indicate which tests were predicted to pass by the test selector module 530, (3) indicate the confidence score generated by the AI model for each test, (4) identify the designation assigned to each test by the system (e.g., "skipped," "automatically deployed," or "actually deployed"), (5) identify any overrides of the test designations made in response to user input, (6) provide an estimate of the cost and run time of the tests selected for actual deployment, (7) provide an estimate of the cost savings and run time reduction associated with the automatic deployment (rather than actual deployment) of the tests selected for automatic deployment, etc.

At step 670, the system may perform the tests designated for actual deployment, and store the test results in the historical database.

As described above, in some embodiments, the system may override the test selector module's designations for one or more tests based on user input received via the test selection UX. For example, a software development engineering may provide input via the test selection UX instructing the system to override a test's designation as "skipped" or "automatically deployed" in favor of actual deployment if the engineer believes the PR requires it (e.g., a critical part of functionality with complex interactions).

In some embodiments, as software is constantly being developed with the addition of new features, data drift may happen quite quickly. For example, for each software release, there may be significant drift in the training data because each release tends to focus on different features of the platform, which means that the text of the pull requests and/or other data may vary significantly from one release to the next. To resolve this challenge, at step 624, the software testing systems and method in the present disclosed embodiments may include an automatic model re-trainer that is linked to project planning software release dates. For each release cycle, the model re-trainer may be triggered and the system may collect the data from the historical test database and builds a new model ready for the next cycle.

The method can include receiving, by the data processing system, the request via a graphical user interface presented on a client device remote from the data processing system. The method can include providing, by the data processing system via the graphical user interface, the indication of the selected subset of the plurality of tests.

The method can include identifying, by the data processing system, the data stored in the one or more repositories can include at least one of pull request data, issue tracker information, or changed files data. The method can include generating, by the data processing system based at least in part on the data, a plurality of features for the version of the application. The method can include determining, by the data processing system based on the plurality of features and via the model, the score for each of the plurality of tests configured to test performance of the version of the application.

The method can include identifying, by the data processing system, the data stored in the one or more repositories can include a number of lines of code in the version of the application that have changed relative to the prior version of the application. The method of can include identifying, by the data processing system from the historical data, a plurality of features. The method can include training, by the data processing system, the model via the machine learning based on the plurality of features and the historical data. The method can include determining, by the data processing system, the score for each of the plurality of tests, the score indicating a likelihood that a test of the plurality of tests passes.

The method can include comparing, by the data processing system, the score for each of the plurality of tests with a threshold, the score indicating a likelihood that a test of the plurality of tests passes. The method can include grouping, by the data processing system based on the comparison, the plurality of tests into the subset of the plurality of tests and a second subset of the plurality of tests that is different from the subset of the plurality of tests. The method can include assigning, by the data processing system, a first action to perform for the subset of the plurality of tests. The method can include assigning, by the data processing system, a second action to perform for the second subset of the plurality of tests, the second action different from the first action.

Figure 7:
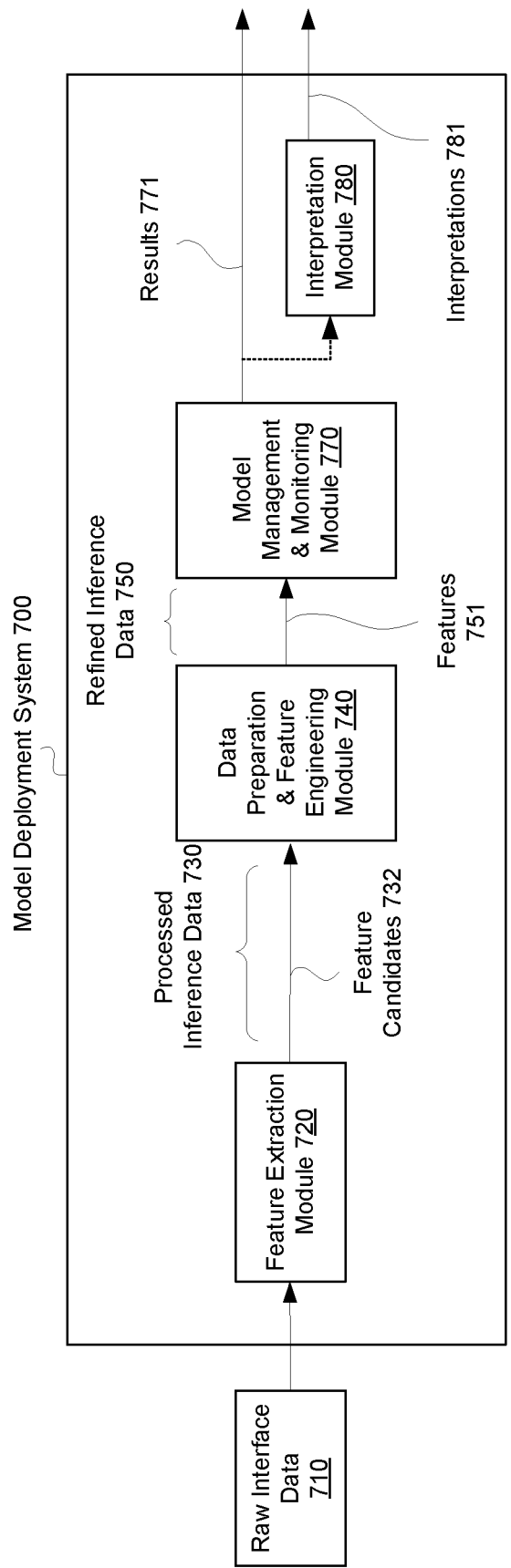
FIG. 7 shows a block diagram of a model deployment system, according to some embodiments.

FIG. 7 is a block diagram of a model deployment system, according to some embodiments. A data analytics model deployment system 700 may include a feature extraction module 720, a data preparation and feature engineering module 740, a model management and monitoring module 770, and an interpretation module 780. In some embodiments, the model deployment system 700 receives raw inference data 710 and processes it using one or more models (e.g., machine learning models, etc.) to solve a problem in a domain of data analytics. The inference data 710 may include spatial data, image data, numeric data, categorical data, text data, and other suitable data. Some embodiments of the components and functions of the model deployment system 700 are described in further detail below.

The feature extraction module 720 may perform data pre-processing and feature extraction on the raw interface data 710, and provide the extracted features to the data preparation and feature engineering module 740 as feature candidates 732 within a processed inference dataset 730. The extracted features may include attributes of objects represented by the raw interface data 710, The data preparation and feature engineering module 740 may perform data preparation and/or feature engineering operations on the processed inference data 730. Some embodiments of suitable techniques for performing data preparation and feature engineering operations are described above with reference to data preparation and feature engineering module 340.

The model management and monitoring module 770 may manage the application of a model to the features 751 of the refined inference data 750, thereby solving the data analytics problem and producing results 771 characterizing the solution.

In some embodiments, the model management and monitoring module 770 may present (e.g., display) evaluations of models on client devices accessible to users. Such model evaluations may include feature importance scores of one or more features for one or more models. Presenting the feature importance scores in this manner may assist the user in understanding the relative performance of the evaluated models. For example, based on the presented feature importance scores, the user (or the system) may identify a top model M that is outperforming the other top models, and one or more features F that are important to the model M but not to the other top models. The user may conclude (or the system may indicate) that, relative to the other top models, the model M is making better use of the information represented by the features F.

The interpretation module 780 may interpret the relationships between the results 771 (e.g., predictions) provided by the model deployment system 700 and the portions of the inference data (e.g., spatial data and/or non-spatial data) on which those results 771 are based, and may provide interpretations (or "explanations") 781 of those relationships. In some embodiments, the interpretation module 780 may perform one or more of the operations described in Appendix A with reference to "image model prediction explanations."

Figure 8:
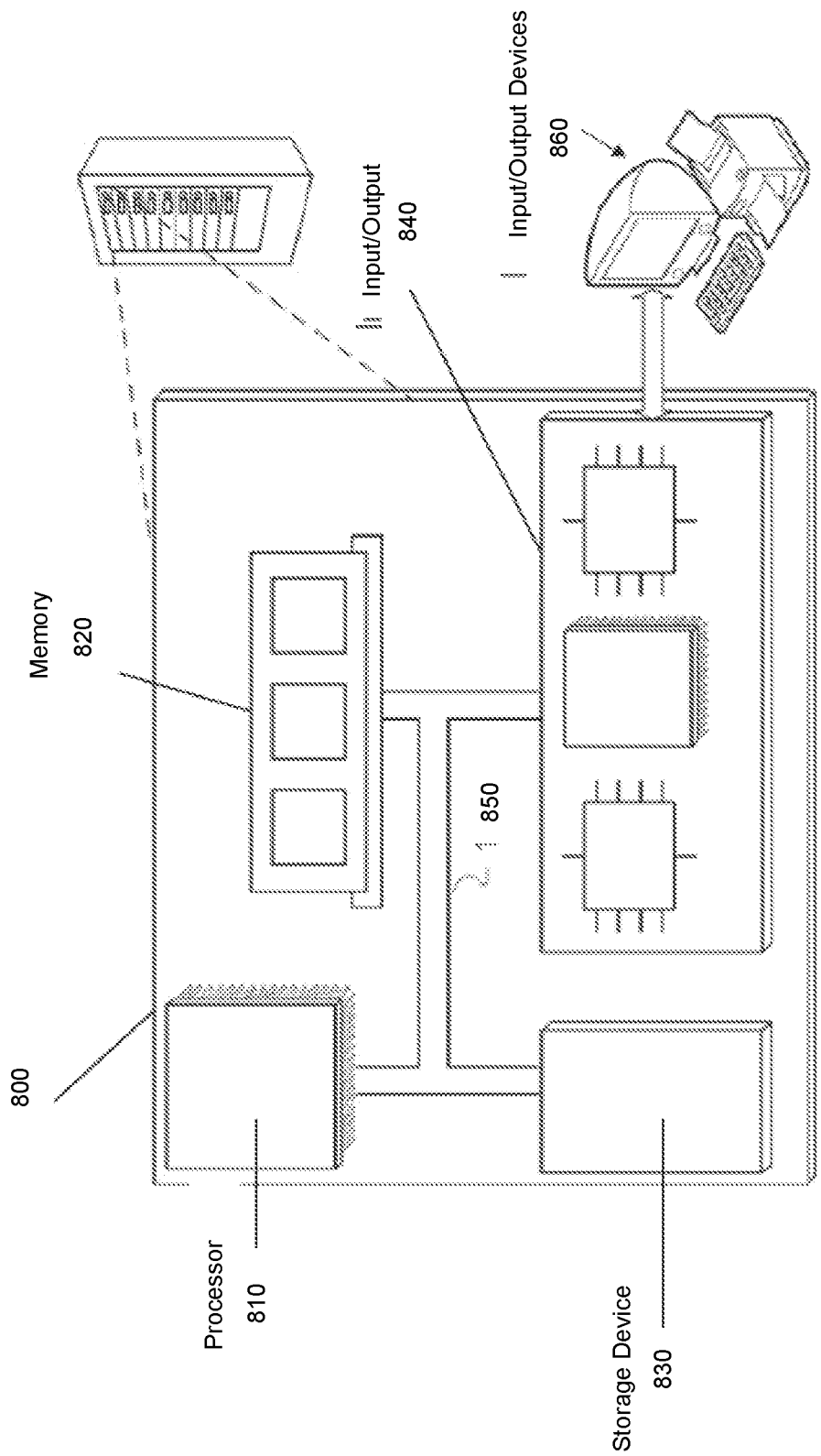
FIG. 8 shows a block diagram of an example computing apparatus.

FIG. 8 is a block diagram of an example computing apparatus. General-purpose computers, network appliances, mobile devices, or other electronic systems may also include at least portions of the computing apparatus 800. The computing apparatus 800 includes a processor 810, a memory 820, a storage device 830, and an input/output device 840. Each of the components 810, 820, 830, and 840 may be interconnected, for example, using a system bus 850. The processor 810 is capable of processing instructions for execution within the computing apparatus 800. In some implementations, the processor 810 is a single-threaded processor. In some implementations, the processor 810 is a multi-threaded processor. The processor 810 is capable of processing instructions stored in the memory 820 or on the storage device 830.

The memory 820 stores information within the computing apparatus 800. In some implementations, the memory 820 is a non-transitory computer-readable medium. In some implementations, the memory 820 is a volatile memory unit. In some implementations, the memory 820 is a non-volatile memory unit.

The storage device 830 is capable of providing mass storage for the computing apparatus 800. In some implementations, the storage device 830 is a non-transitory computer-readable medium. In various different implementations, the storage device 830 may include, for example, a hard disk device, an optical disk device, a solid-date drive, a flash drive, or some other large capacity storage device. For example, the storage device may store long-term data (e.g., database data, file system data, etc.). The input/output device 840 provides input/output operations for the computing apparatus 800. In some implementations, the input/output device 840 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 860. In some examples, mobile computing devices, mobile communication devices, and other devices may be used.

The one or more processors can receive the request via a graphical user interface presented on a client device remote from the data processing system. The one or more processors can provide, via the graphical user interface, the indication of the selected subset of the plurality of tests. The foregoing Summary is intended to assist the reader in understanding the present disclosure, and does not limit the scope of any of the claims.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 830 may be implemented in a distributed way over a network, for example as a server farm or a set of widely distributed servers, or may be implemented in a single computing device.

Although an example computing device has been described in FIG. 8, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, an engine, a pipeline, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 9:
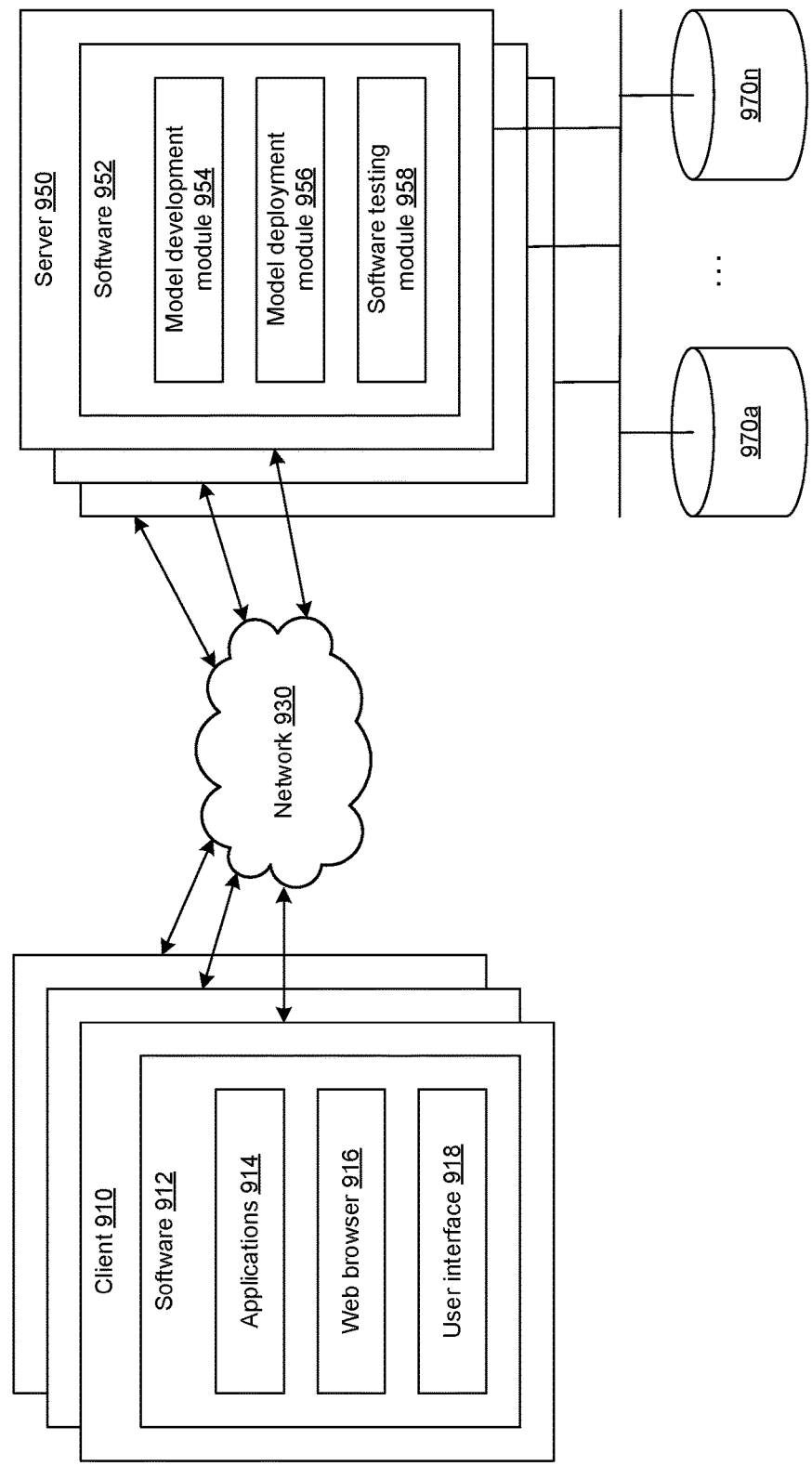
FIG. 9 shows a block diagram of a computer system for implementing the software testing systems and methods, according to some embodiments.

Referring to FIG. 9, in some embodiments, a software testing system 900 includes at least one client 910 and at least one server 950. The illustrative configuration is only for exemplary purposes, and it is intended that there can be any number of clients 910 and/or servers 950. Each client 910 and each server 950 may be or include a computing apparatus 800 and/or a virtual machine.

In some embodiments, software testing system 900 may perform one or more (e.g., all) steps of method 600. In some embodiments, a client 910 may implement a user interface 918 of the software testing system 900, the model development module 954 of a server 950 may implement or control a model development system 300, the model deployment module 956 of a server 950 may implement or control a model deployment system 700, and a software testing module 958 of a server 950 may implement or control a software testing platform 500. However, embodiments are not limited by the manner in which the components of the software testing system 900 are distributed between client(s) 910 and server(s) 950. For example, the server 950 can include software 952 at least partially implementing the model development module 954, the model deployment module 956, and the software testing module 958. Furthermore, in some embodiments, all components of the software testing system 900 may be implemented on a single computing apparatus (instead of being distributed between one or more clients 910 and/or servers 950.

One or more communications networks 930 connect the client(s) 910 with the server(s) 950. Some examples of communication networks are described above. The communication may take place via any media such as standard telephone lines, LAN or WAN links, broadband connections, wireless links, etc. Preferably, the network 930 can carry TCP/IP protocol communications, and data (e.g., HTTP/HTTPS requests, etc.) transmitted by client(s) 910 and server(s) 950 can be communicated over such TCP/IP networks. The type of network is not a limitation, however, and any suitable network may be used. Some non-limiting examples of networks that can serve as or be part of the communications network 930 include a wireless or wired Ethernet-based intranet, a local or wide-area network (LAN or WAN), and/or the global communications network known as the Internet, which may accommodate many different communications media and protocols.

A client 910 may be implemented with software 512 running on hardware or a virtual machine. In some embodiments, the hardware may include a general-purpose computing device 800 (e.g., a desktop computer, laptop computer, mobile phone, tablet, etc.) or a special-purpose hardware device designed specifically to provide the functionality of a client 910. In some embodiments, clients 910 can be operated and used for various activities including sending and receiving electronic mail, requesting and viewing content available over the Internet, or performing other tasks commonly done using a computer, handheld device, or mobile phone. Clients 910 can also be operated by users on behalf of others, such as employers, who provide the clients 910 to the users as part of their employment.

In various embodiments, the software 912 of client 910 includes one or more applications 914 and/or a web browser 916. The web browser 916 allows the client 910 to request a web page or other downloadable program, application, or document (e.g., from the server 950) with a web-page request. One example of a web page is a data file that includes computer executable or interpretable information, graphics, sound, text, and/or video, that can be displayed, executed, played, processed, streamed, and/or stored and that can contain links, or pointers, to other web pages. In some embodiments, the web browser 916 and/or application(s) 914 may allow the client to access a user interface 918 for a software testing system 900. Some examples of user interfaces (e.g., a test selection user interface) are described above.

The server 950 interacts with the client 910. The server 950 is preferably implemented on one or more server-class computers that have sufficient memory, data storage, and processing power and that run a server-class operating system. System hardware and software other than that specifically described herein may also be used, depending on the capacity of the device and the size of the user base. For example, the server 950 may be or may be part of a logical group of one or more servers such as a server farm or server network. As another example, there may be multiple servers 950 associated with or connected to each other, or multiple servers may operate independently, but with shared data. In a further embodiment and as is typical in large-scale systems, application software can be implemented in components, with different components running on different server computers, on the same server, or some combination.

In some embodiments, server 950 includes or is communicatively coupled to one or more data storage apparatus 970. For example, the data storage apparatus 970 can include at least a first data storage apparatus 970*a* and a second data storage apparatus 970*n*. For example, the data storage apparatus 970 can include any number of data storage apparatuses 970*a*-*n* in accordance with a local or distributed data storage architecture. In some embodiments, server 950 may communicate the outputs of the software testing module 958 to the client 910. One or more (e.g., each) of the modules described throughout the specification (e.g., the modules of a model development system 300, a model deployment system 700, and/or a software testing platform 500) can be implemented in whole or in part as software program using any suitable programming language or languages and/or as a hardware device (e.g., ASIC, FPGA, processor, memory, storage and the like).

At least one aspect is directed to an automated software testing method. The method can include receiving, by a software test selection system, a request to test software The method can include generating, by a data preparation module of the software test selection system, a plurality of model features based on data associated with the request The method can include generating, by a machine-learned software testing model of the software test selection system, a plurality of predictive values indicating whether each of a plurality of tests is predicted to pass, where the machine-learned software testing model generates the plurality of predictive values based on the model features The method can include selecting, by a test selector module of the software test selection system, first and second subsets of the plurality of tests based on the plurality of predictive values The method can include initiating, by the software test selection system, performance of the second subset of tests.

The method can include the data associated with the request provided by an automated software testing platform and/or a code management system.

The method can include obtaining the data associated with the request, where obtaining at least a portion of the data associated with the request includes automatically extracting, by the data preparation module of the software test selection system, one or more test run logs from the automated software testing platform.

The method can include storing the generated model features in a data store.

The method can include the data store that includes training data for the machine-learned software testing model.

The method can include the data store that includes scoring data for the machine-learned software testing model.

The method can include selecting the first and second subsets of the tests by at least comparing the plurality of predictive values to a confidence threshold. The method can include selecting, as the first subset of the tests, one or more tests for which the corresponding predictive values from the plurality of predictive values are greater than or equal to the confidence threshold, where the first subset of tests are predicted to pass The method can include applying guard rail checking to the first subset of tests The method can include selecting, as the second subset of the tests, one or more tests for which the corresponding predictive values from the plurality of predictive values are lower than the confidence threshold.

The method can include applying the guard rail checking to the first subset of tests by at least selecting one or more tests in the first subset of tests for automatic deployment.

The method can include at least one of the tests selected for automatic deployment based on application of one or more rules, a blacklist of files, or a whitelist of files.

The method can include applying the guard rail checking to the first subset of tests by at least presenting, on a client device, a user interface including one or more user interface components for designating one or more tests to be skipped, automatically deployed, or actually deployed. The method can include at least one of the tests selected for automatic deployment is selected based on user input received via the user interface.

The method can include initiating performance of the second subset of tests The method can include obtaining test results of the second subset of tests The method can include storing the test results in a datastore.

The method can include the plurality of predictive values including a plurality of respective quantitative values.

At least one aspect is directed to an automated software testing system, including a processor, a memory, and one or more modules stored in the memory and executable by the processor to perform operations. The processor can perform operations including receiving a request to test software The processor can perform operations including generating a plurality of model features based on data associated with the request The processor can perform operations including generating, by a machine-learned software testing model, a plurality of predictive values indicating whether each of a plurality of tests is predicted to pass, where the machine-learned software testing model generates the plurality of predictive values based on the model features The processor can perform operations including selecting first and second subsets of the plurality of tests based on the plurality of predictive values. The processor can perform operations including initiating performance of the second subset of tests.

The system can include the data associated with the request provided by an automated software testing platform and/or a code management system.

The processor can perform operations including obtaining the data associated with the request, and where obtaining at least a portion of the data associated with the request includes automatically extracting one or more test run logs from the automated software testing platform.

The processor can perform operations including storing the generated model features in a data store in the memory.

The system can include the data store with training data and/or scoring data for the machine-learned software testing model.

The processor can perform operations including selecting the first and second subsets of the tests by at least comparing the plurality of predictive values to a confidence threshold. The processor can perform operations including selecting the first and second subsets of the tests by at least selecting, as the first subset of the tests, one or more tests for which the corresponding predictive values from the plurality of predictive values are greater than or equal to the confidence threshold, where the first subset of tests are predicted to pass. The processor can perform operations including selecting the first and second subsets of the tests by at least applying guard rail checking to the first subset of tests. The processor can perform operations including selecting the first and second subsets of the tests by at least selecting, as the second subset of the tests, one or more tests for which the corresponding predictive values from the plurality of predictive values are lower than the confidence threshold.

The processor can perform operations including applying the guard rail checking to the first subset of tests by at least selecting one or more tests in the first subset of tests for automatic deployment.

The system can include at least one of the tests selected for automatic deployment based on application of one or more rules, a blacklist of files, or a whitelist of files.

The system can include a client device, where applying the guard rail checking to the first subset of tests includes presenting, on the client device, a user interface including one or more user interface components for designating one or more tests to be skipped, automatically deployed, or actually deployed. The system can include at least one of the tests selected for automatic deployment based on user input received via the user interface.

The processor can perform operations including initiating performance of the second subset of tests. The processor can perform operations including obtaining test results of the second subset of tests. The processor can perform operations including storing the test results in a datastore.

At least one aspect is directed to a non-transitory computer readable medium storing instructions which, when executed by a processor, cause operations to be performed. The processor can perform operations including receiving, by a software test selection system, a request to test software. The processor can perform operations including generating, by a data preparation module of the software test selection system, a plurality of model features based on data associated with the request. The processor can perform operations including generating, by a machine-learned software testing model of the software test selection system, a plurality of predictive values indicating whether each of a plurality of tests is predicted to pass, where the machine-learned software testing model generates the plurality of predictive values based on the model features. The processor can perform operations including selecting, by a test selector module of the software test selection system, first and second subsets of the tests based on the plurality of predictive values. The processor can perform operations including initiating, by the software test selection system, performance of the second subset of tests.

At least one aspect is directed to an automated software testing system with a display device, a processor, a memory, and one or more modules stored in the memory and executable by the processor to perform operations. The processor can perform operations including presenting, on the display device, a test selection user interface configured to identify one or more software tests and to indicate, for each of the software tests, a respective designation assigned to the software test by a software test selection system, where the designations indicate whether the corresponding tests are to be skipped, automatically deployed, or actually deployed, and where the test selection user interface is further configured to present a user interface component configured to receive user input relating to the designations assigned to the software tests. The processor can perform operations including receiving, via the user interface component, user input related to changing the designation assigned to a first test included in the software tests. The processor can perform operations including based on the user input, changing the designation assigned to the first test. The processor can perform operations including initiating performance of a subset of the software tests having the designation indicating that the respective software tests are to be actually deployed.

In the system, the user input can relate to changing the designation assigned to the first test from a first designation indicating the first test is to be skipped to a second designation indicating the first test is to be automatically deployed.

In the system, the user input can relate to changing the designation assigned to the first test from a second designation indicating the first test is to be automatically deployed to a third designation indicating the first test is to be actually deployed While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

Measurements, sizes, amounts, etc. may be presented herein in a range format. The description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as 10-20 inches should be considered to have specifically disclosed subranges such as 10-11 inches, 10-12 inches, 10-13 inches, 10-14 inches, 11-12 inches, 11-13 inches, etc.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, e.g., elements that are conjunctively present in some cases and disjunctively present in other cases. Multiple elements listed with "and/or" should be construed in the same fashion, e.g., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, e.g., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (e.g. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A system, comprising:
   a data processing system comprising memory and one or more processors configured to perform operations including:
   receiving a request to test performance of a version of an application;
   identifying, responsive to the request, data stored in one or more repositories that indicate changes in the version of the application relative to a prior version of the application tested or deployed before receipt of the request to test the performance of the version of the application;

determining, based on the data and via a model trained using machine learning with historical data associated with one or more applications tested or deployed before receipt of the request to test performance of the version, and without execution of a plurality of tests, a score for each of the plurality of tests configured to test performance of the version of the application;

selecting, based at least in part on the score for each of the plurality of tests, a subset of the plurality of tests to execute; and providing an indication of the selected subset of the plurality of tests to cause execution of the subset of the plurality of tests to evaluate performance of the version of the application prior to deployment of the version of the application.

2. The system of claim 1, the operations further including:
receiving the request via a graphical user interface presented on a client device remote from the data processing system; and
providing, via the graphical user interface, the indication of the selected subset of the plurality of tests.

3. The system of claim 1, the operations further including:
identifying the data stored in the one or more repositories comprising at least one of pull request data, issue tracker information, or changed files data;
generating, based at least in part on the data, a plurality of features for the version of the application; and
determine, based on the plurality of features and via the model, the score for each of the plurality of tests configured to test performance of the version of the application.

4. The system of claim 1, the operations further including:
identifying the data stored in the one or more repositories comprising a number of lines of code in the version of the application that have changed relative to the prior version of the application.

5. The system of claim 1, the operations further including:
identifying, from the historical data, a plurality of features; and
training the model via the machine learning based on the plurality of features and the historical data.

6. The system of claim 1, the operations further including:
performing pre-processing on raw data associated with the historical data; and
generating a plurality of features based on the pre-processed raw data.

7. The system of claim 1, the operations further including:
determining the score for each of the plurality of tests, the score indicating a likelihood that a test of the plurality of tests passes.

8. The system of claim 1, the operations further including:
comparing the score for each of the plurality of tests with a threshold;
grouping, based on the comparison, the plurality of tests into the subset of the plurality of tests and a second subset of the plurality of tests that is different from the subset of the plurality of tests;
assigning a first action to perform for the subset of the plurality of tests; and
assigning a second action to perform for the second subset of the plurality of tests, the second action different from the first action.

9. The system of claim 8, wherein the first action corresponds to execution of the test, and the second action corresponds to skipping the test or automatic deployment of the test.

10. The system of claim 1, the operations further including:
determining the score for each of the plurality of tests, the score indicating a likelihood that a test of the plurality of tests passes; and
selecting the subset of the plurality of tests based on the score of the subset of the plurality of tests less than a threshold.

11. The system of claim 1, the operations further including:
determining the score for each of the plurality of tests, the score indicating a likelihood that a test of the plurality of tests passes;
selecting a second subset of the plurality of tests based on the score of the second subset of the plurality of tests greater than a threshold; and
skipping execution of the second subset of the plurality of tests to reduce computing resource utilization associated with performance testing of the version of the application, wherein the subset of the plurality of tests is less than the plurality of the tests.

12. A method, comprising:
receiving, by a data processing system comprising memory and one or more processors, a request to test performance of a version of an application;
identifying, by the data processing system, responsive to the request, data stored in one or more repositories that indicate changes in the version of the application relative to a prior version of the application tested or deployed before receipt of the request to test the performance of the version of the application;
determining, by the data processing system, based on the data and via a model trained using machine learning with historical data associated with one or more applications tested or deployed before receipt of the request to test performance of the version, and without execution of a plurality of tests, a score for each of the plurality of tests configured to test performance of the version of the application;
selecting, by the data processing system based at least in part on the score for each of the plurality of tests, a subset of the plurality of tests to execute; and
providing, by the data processing system, an indication of the selected subset of the plurality of tests to cause execution of the subset of the plurality of tests to evaluate performance of the version of the application prior to deployment of the version of the application.

13. The method of claim 12, comprising:
receiving, by the data processing system, the request via a graphical user interface presented on a client device remote from the data processing system; and
providing, by the data processing system via the graphical user interface, the indication of the selected subset of the plurality of tests.

14. The method of claim 12, comprising:
identifying, by the data processing system, the data stored in the one or more repositories comprising at least one of pull request data, issue tracker information, or changed files data;
generating, by the data processing system based at least in part on the data, a plurality of features for the version of the application; and determining, by the data processing system based on the plurality of features and via the model, the score for each of the plurality of tests configured to test performance of the version of the application.

15. The method of claim 12, comprising:
identifying, by the data processing system, the data stored in the one or more repositories comprising a number of lines of code in the version of the application that have changed relative to the prior version of the application.

16. The method of claim 12, comprising:
identifying, by the data processing system from the historical data, a plurality of features; and
training, by the data processing system, the model via the machine learning based on the plurality of features and the historical data.

17. The method of claim 12, comprising:
determining, by the data processing system, the score for each of the plurality of tests, the score indicating a likelihood that a test of the plurality of tests passes.

18. The method of claim 12, comprising:
comparing, by the data processing system, the score for each of the plurality of tests with a threshold, the score indicating a likelihood that a test of the plurality of tests passes;
grouping, by the data processing system based on the comparison, the plurality of tests into the subset of the plurality of tests and a second subset of the plurality of tests that is different from the subset of the plurality of tests;
assigning, by the data processing system, a first action to perform for the subset of the plurality of tests; and
assigning, by the data processing system, a second action to perform for the second subset of the plurality of tests, the second action different from the first action.

19. A non-transitory computer-readable medium storing instructions that, when executed by one or more processors, cause the one or more processors to:
receive a request to test performance of a version of an application;
identify, responsive to the request, data stored in one or more repositories that indicate changes in the version of the application relative to a prior version of the application tested or deployed before receipt of the request to test the performance of the version of the application;
determine, based on the data and via a model trained using machine learning with historical data associated with one or more applications tested or deployed before receipt of the request to test performance of the version, and without execution of a plurality of tests, a score for each of the plurality of tests configured to test performance of the version of the application;
select, based at least in part on the score for each of the plurality of tests, a subset of the plurality of tests to execute; and
provide an indication of the selected subset of the plurality of tests to cause execution of the subset of the plurality of tests to evaluate performance of the version of the application prior to deployment of the version of the application.

20. The non-transitory computer-readable medium of claim 19, wherein the instructions further comprise instructions to:
receive the request via a graphical user interface presented on a client device remote from the one or more processors; and
provide, via the graphical user interface, the indication of the selected subset of the plurality of tests.

* * * * *